(12) United States Patent
Kopf et al.

(10) Patent No.: US 10,002,640 B2
(45) Date of Patent: Jun. 19, 2018

(54) HYPER-LAPSE VIDEO THROUGH TIME-LAPSE AND STABILIZATION

(71) Applicant: Microsoft Corporation, Redmond, WA (US)

(72) Inventors: Johannes Peter Kopf, Hamburg (DE); Michael F. Cohen, Seattle, WA (US); Richard Szeliski, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days. days.

(21) Appl. No.: 14/320,411

(22) Filed: Jun. 30, 2014

(65) Prior Publication Data

US 2015/0248916 A1  Sep. 3, 2015

Related U.S. Application Data

(60) Provisional application No. 61/945,857, filed on Feb. 28, 2014.

(51) Int. Cl.
*G11B 27/034*   (2006.01)
*H04N 5/76*   (2006.01)
(Continued)

(52) U.S. Cl.
CPC ............ *G11B 27/034* (2013.01); *G06T 5/002* (2013.01); *G06T 5/50* (2013.01); *G06T 7/30* (2017.01);
(Continued)

(58) Field of Classification Search
CPC ....... G11B 27/034; G11B 27/02; G06T 5/002; G06T 5/50; G06T 7/0071;
(Continued)

(56) References Cited

U.S. PATENT DOCUMENTS 7,003,154 B1 *   2/2006   Peker ................... H04N 19/172
                                          375/E7.145
7,852,370 B2 *   12/2010   Peleg .................... G06T 3/0087
                                          348/218.1
(Continued)

OTHER PUBLICATIONS

"International Search Report and Written Opinion for PCT Patent Application No. PCT/US2015/017622", dated Jun. 9, 2015, 11 Pages.
(Continued)

*Primary Examiner* — Gevell Selby
(74) *Attorney, Agent, or Firm* — Medley, Behrens & Lewis, LLC

(57) ABSTRACT

Various technologies described herein pertain to generation of an output hyper-lapse video from an input video. A smoothed camera path can be computed based upon the input video. Further, output camera poses can be selected from the smoothed camera path for output frames of the output hyper-lapse video. One or more selected input frames from the input video can be chosen for an output frame. The selected input frames can be chosen based at least in part upon an output camera pose for the output frame. Moreover, the selected input frames can be combined to render the output frame. Choosing selected input frames from the input video and combining the selected input frames can be performed for each of the output frames of the output hyper-lapse video.

34 Claims, 12 Drawing Sheets

(51) Int. Cl.
| | |
|---|---|
| *G11B 27/02* | (2006.01) |
| *G06T 5/00* | (2006.01) |
| *G06T 5/50* | (2006.01) |
| *G06T 7/30* | (2017.01) |
| *G06T 7/579* | (2017.01) |
| *G06T 7/557* | (2017.01) |
| *H04N 5/232* | (2006.01) |
| *H04N 5/262* | (2006.01) |

(52) U.S. Cl.
CPC .............. *G06T 7/557* (2017.01); *G06T 7/579* (2017.01); *G11B 27/02* (2013.01); *H04N 5/7605* (2013.01); *G06T 2207/10016* (2013.01); *G06T 2207/20182* (2013.01); *G06T 2207/20221* (2013.01); *G06T 2207/30241* (2013.01); *H04N 5/23267* (2013.01); *H04N 5/262* (2013.01)

(58) Field of Classification Search
CPC . G06T 2207/10016; G06T 2207/30241; G06T 2207/20182; G06T 2207/20221; H04N 5/7605
USPC ....................................................... 348/208.1
See application file for complete search history.

(56) References Cited

U.S. PATENT DOCUMENTS

| | | | |
|---|---|---|---|
| 8,355,083 B2 | 1/2013 | Keiser et al. | |
| 8,502,817 B2 | 8/2013 | Deb et al. | |
| 8,587,583 B2 | 11/2013 | Newcombe et al. | |
| 8,749,644 B2* | 6/2014 | Lee ........................... | G06T 7/20 348/208.4 |
| 2006/0257042 A1 | 11/2006 | Ofek et al. | |
| 2012/0120264 A1* | 5/2012 | Lee ........................... | G06T 7/20 348/208.4 |
| 2012/0314040 A1 | 12/2012 | Kopf et al. | |
| 2013/0127993 A1* | 5/2013 | Wang ................. | H04N 13/0022 348/46 |
| 2013/0215239 A1 | 8/2013 | Wang et al. | |
| 2013/0271621 A1* | 10/2013 | Lee ........................ | H04N 5/232 348/222.1 |
| 2013/0329020 A1 | 12/2013 | Kriveshko et al. | |
| 2014/0368651 A1* | 12/2014 | Irschara .................... | G06T 7/00 348/148 |

OTHER PUBLICATIONS

Buehler, et al., "Non-Metric Image-Based Rendering for Video Stabilization", In Proceedings of the IEEE Computer Society Conference on Conference on Computer Vision and Pattern Recognition, vol. 2, Dec. 8, 2001, pp. 609-614.

Smith, et al., "Light Field Video Stabilization", Retrieved at: «http://ieeexplore.ieee.org/stamp/stamp.jsp?tp=&arnumber=5459270», In IEEE 12th International Conference on Computer Vision, Sep. 29, 2009, 8 pages.

Kurz, et al., "Generating Realistic Camera Shake for Virtual Scenes", Retrieved at: «https://www.jvrb.org/past-issues/10.2013/3833/1020137.pdf», Journal of Virtual Reality and Broadcasting, vol. 10, No. 7, Dec. 2013, 13 pages.

Grundmann, et al., "Auto-Directed Video Stabilization with Robust L1 Optimal Camera Paths", Retrieved at: «http://static.googleusercontent.com/media/research.google.com/en//pubs/archive/37041.pdf», In 24th IEEE Conference on Computer Vision and Pattern Recognition, Jun. 20, 2011, 8 pages.

Nieuwenhuisen, et al., "Motion Planning for Camera Movements in Virtual Environments", Retrieved at: «http://ai.stanford.edu/~latombe/cs326/2003/class10/utrecht.pdf», Jan. 30, 2003, 19 pages.

Agarwala, et al., "Interactive Digital Photomontage", Retrieved at: «http://dl.acm.org/citation.cfm?id=1015718», In Proceedings of in ACM Transactions on Graphics, vol. 23, Issue 3, Aug. 2004, 9 pages.

Beardsley, et al., "3D Model Acquisition from Extended Image Sequences", Retrieved at: «http://www.robots.ox.ac.uk/~vgg/publications/1996/Beardsley96/beardsley96.pdf», In Proceedings of the 4th European Conference on Computer Vision, vol. II, Apr. 15, 1996, 13 pages.

Buehler, et al., "Unstructured Lumigraph Rendering", Retrieved at: «http://dl.acm.org/citation.cfm?id=383309», In Proceedings of 28th Annual Conference on Computer Graphics and Interactive Techniques, Aug. 12, 2001, 8 pages.

Chen, et al., "Video Summarization Preserving Dynamic Content", Retrieved at: «http://dl.acm.org/citation.cfm?id=1290038», In Proceedings of the International Workshop on TRECVID Video Summarization, Sep. 28, 2007, pp. 40-44.

Crandall, et al., "SfM with MRFs: Discrete-Continuous Optimization for Large-Scale Structure from Motion", Retrieved at: «http://ieeexplore.ieee.org/stamp/stamp.jsp?tp=&arnumber=6327192», In IEEE Transactions on Pattern Analysis and Machine Intelligence, vol. 35, Issue 12, Dec. 2013, pp. 2841-2853.

Detyniecki, et al., "Adaptive Acceleration and Shot Stacking for Video Rushes Summarization", Retrieved at: «http://www-poleia.lip6.fr/~marcin/papers/Detynieck_ACMMMTVS_08.pdf», In Proceedings of 2nd ACM TRECVid Video Summarization Workshop, Oct. 31, 2008, pp. 109-113.

Furukawa, et al., "Accurate, Dense, and Robust Multiview Stereopsis", Retrieved at: «http://ieeexplore.ieee.org/stamp/stamp.jsp?tp=&arnumber=5226635», In IEEE Transactions on Pattern Analysis and Machine Intelligence, vol. 32, Issue 8, Aug. 2010, pp. 1362-1376.

Goldstein, et al., "Video Stabilization Using Epipolar Geometry", Retrieved at: «http://dl.acm.org/citation.cfm?id=2231824», In Journal ACM Transactions on Graphics, vol. 31, Issue 5, Aug. 2012, 10 pages.

Kwatra, et al., "Graphcut Textures: Image and Video Synthesis Using Graph Cuts", Retrieved at: «http://www.cc.gatech.edu/cpl/projects/graphcuttextures/gc-final.pdf», ACM Transactions on Graphics (Proc. SIGGRAPH 2003), vol. 22, Issue 3, 2003, 10 pages.

Horn, Berthold K. P., "Closed-form Solution of Absolute Orientation Using Unit Quaternions", Retrieved at: «http://people.csail.mit.edu/bkph/papers/Absolute_Orientation.pdf», In Journal of the Optical Society of America A, vol. 4, Apr. 1987, pp. 629-642.

Kolmogorov, et al., "What energy functions can be minimized via graph cuts?", Retrieved at: «http://ieeexplore.ieee.org/stamp/stamp.jsp?tp=&arnumber=1262177», In IEEE Transactions on Pattern Analysis and Machine Intelligence, vol. 26, No. 2, Feb. 2004, pp. 147-159.

Liu, et al., "Content-Preserving Warps for 3D Video Stabilization", Retrieved at: «http://ieeexplore.ieee.org/stamp/stamp.jsp?tp=&arnumber=1262177», In Proceedings of ACM Transactions on Graphics, vol. 28, No. 3, Article 44, Aug. 2009, 10 pages.

Liu, et al., "Subspace Video Stabilization", Retrieved at: «http://dl.acm.org/citation.cfm?id=1899408», In Proceedings of ACM Transactions on Graphics, vol. 30, Issue 1, Jan. 2011, 10 pages.

Liu, et al., "Bundled Camera Paths for Video Stabilization", Retrieved at: «http://dl.acm.org/citation.cfm?id=2461995», In Journal ACM Transactions on Graphics, vol. 32, Issue 4, Jul. 2013, 10 pages.

Lombaert, et al., "A Multilevel Banded Graph Cuts Method for Fast Image Segmentation", Retrieved at: «http://ieeexplore.ieee.org/stamp/stamp.jsp?tp=&arnumber=1541265», In 10th IEEE International Conference on Computer Vision, vol. 1, Oct. 17, 2005, 7 pages.

Matsushita, et al., "Full-Frame Video Stabilization with Motion Inpainting", Retrieved at: «http://ieeexplore.ieee.org/stamp/stamp.jsp?tp=&arnumber=1634345», In IEEE Transactions on Pattern Analysis and Machine Intelligence, vol. 28, No. 7, Jul. 2006, pp. 1150-1163.

Scaramuzza, et al., "A Toolbox for Easily Calibrating Omnidirectional Cameras", Retrieved at: «http://ieeexplore.ieee.org/xpl/login.jsp?tp=&arnumber=4059340&url=http%3A%2F%2Fieeexplore.ieee.org%2Fxpls%2Fabs_all.jsp%3Farnumber%3D4059340», In IEEE/RSJ International Conference on Intelligent Robots and Systems, Oct. 9, 2006, pp. 5695-5701.

(56) References Cited

OTHER PUBLICATIONS

Schwarz, Gideon, "Estimating the Dimension of a Model", Retrieved at: «http://www.andrew.cmu.edu/user/kk3n/simplicity/schwarzbic.pdf», In Annals of Statistics, vol. 6, No. 2, Mar. 1978, 5 pages.

Shewchuk, Jonathan Richard, "An Introduction to the Conjugate Gradient Method without the Agonizing Pain", Retrieved at: «http://www.cs.cmu.edu/~quake-papers/painless-conjugate-gradient.pdf», Aug. 4, 1994, 64 pages.

Snavely, et al., "Photo Tourism: Exploring Photo Collections in 3D", Retrieved at: «http://dl.acm.org/citation.cfm?id=1141964», In Journal ACM Transactions on Graphics, vol. 25, Issue 3, Jul. 2006, pp. 835-846.

Snavely, et al., "Finding Paths through the World's Photos", Retrieved at: «http://dl.acm.org/citation.cfm?id=1360614», In Journal ACM Transactions on Graphics, vol. 27, Issue 3, Aug. 2008, 12 pages.

Taubin, et al., "Optimal Surface Smoothing as Filter Design", Retrieved at: «http://www.ann.jussieu.fr/~frey/papers/meshing/Taubin%20G.,%20Optimal%20surface%20smoothing%20as%20filter%20design.pdf», In Proceedings of the 4th European Conference on Computer Vision, vol. 1, Apr. 15, 1996, 24 pages.

Wang, et al., "Fitting B-Spline Curves to Point Clouds by Curvature-Based Squared Distance Minimization", Retrieved at: «http://dl.acm.org/citation.cfm?id=1138453», In Journal of ACM Transactions on Graphics, vol. 25, Issue 2, 2006, 25 pages.

Wu, Changchang, "Towards Linear-time Incremental Structure from Motion", Retrieved at: «http://ieeexplore.ieee.org/stamp/stamp.jsp?tp=&arnumber=6599068», In Proceedings of International Conference on 3D Vision, Jun. 29, 2013, pp. 127-134.

Nocedal, et al., "Numerical Optimization", Retrieved at: «https://www.cs.tcd.ie/~yoonj/papers'/Others/[Nocedal]%20-%20Numerical%20Optimization%202ed.pdf», In Springer Series in Operations Research and Financial, Retrieval date: Feb. 25, 2014, 683 pages.

"Response to the International Search Report (ISR) and Written Opinion for PCT Patent Application No. PCT/US2015/017622", Filed Date: Sep. 23, 2015, 11 Pages.

"Written Opinion of the International Preliminary Examining Authority for PCT Patent Application No. PCT/US2015/017622", dated Jan. 25, 2016, 21 pages.

"International Preliminary Report on Patentability for PCT Patent Application No. PCT/US2015/017622", dated May 9, 2016, 19 pages.

"Response to the Office Action for European Patent Application No. 15708659.6", Filed Date: Apr. 6, 2017, 18 Pages.

"Response to the Office Action for Chinese Patent Application No. 201580011237.2", Filed Date: Feb. 17, 2017, 19 Pages.

"Office Action Issued in European Patent Application No. 15708659.6", dated Jan. 29, 2018, 7 Pages.

* cited by examiner

HYPER-LAPSE VIDEO THROUGH TIME-LAPSE AND STABILIZATION

CROSS-REFERENCE TO RELATED APPLICATION

This application claims priority to U.S. Provisional Patent Application No. 61/945,857, filed on Feb. 28, 2014, and entitled "VIDEO HYPER-LAPSE", the entirety of which is incorporated herein by reference.

BACKGROUND

Traditional cameras were oftentimes expensive, heavy, and difficult to operate devices. More recently, digital cameras have become cheaper, smaller, easier to use, and have become practically ubiquitous. Cameras are now commonly attached to cars, computers, and phones. Further, wearable cameras are increasing in popularity. Wearable cameras can be referred to as first-person cameras, since the action is seen as if through the eye of the camera operator.

A captured video may be long and monotonous, and thus, may be boring to watch and difficult to navigate. Various conventional approaches employ time-lapse techniques to shorten such a video. For instance, a speed of a video may be increased by selecting every n-th frame of the video for a resulting time-lapse video.

Moreover, a camera, while in motion, can be used to capture a video. Traditional time-lapse techniques can be applied to a video captured by a camera moving through space. The resulting time-lapse video can be referred to as a hyper-lapse video, emphasizing that the video was obtained by a camera moving through space and the video has been accelerated through time.

Videos captured by a moving camera oftentimes suffer from erratic camera shake and changing illumination conditions. For instance, videos casually captured by a camera held, worn, or otherwise movable in concert with a user, when the user is walking, running, climbing, hiking, riding (e.g., a bicycle, a vehicle, a train, etc.), skiing, skydiving, or otherwise moving through space, can include significant shake and/or twists and turns. Accordingly, conventional time-lapse techniques that increase frame rates of such videos can amplify the camera shake, thereby degrading the watchability of the resulting videos.

SUMMARY

Described herein are various technologies that pertain to generation of an output hyper-lapse video from an input video. A smoothed camera path can be computed based upon the input video. Further, output camera poses can be selected from the smoothed camera path for output frames of the output hyper-lapse video. One or more selected input frames from the input video can be chosen for an output frame. The selected input frames can be chosen based at least in part upon an output camera pose for the output frame. Moreover, the selected input frames can be combined to render the output frame. Choosing selected input frames from the input video and combining the selected input frames can be performed for each of the output frames of the output hyper-lapse video.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
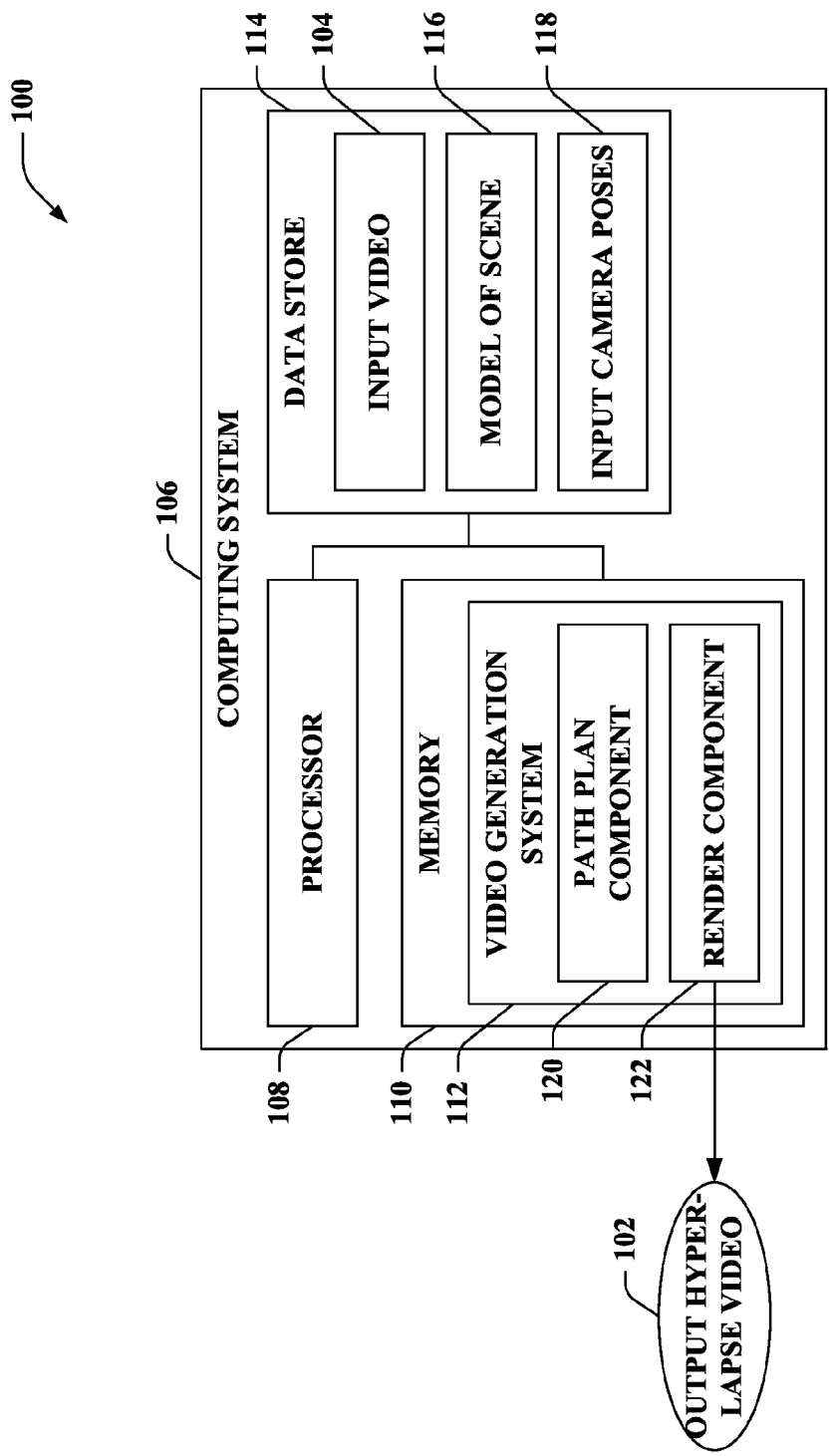
FIG. 1 illustrates a functional block diagram of an exemplary system that generates an output hyper-lapse video from an input video.

Various technologies pertaining to creating an output hyper-lapse video from an input video are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

As set forth herein, various techniques are described for generating an output hyper-lapse video from an input video. The input video can be captured by a camera that is moving through space over time. Further, the input video can include motion noise. The input video obtained by the moving camera is accelerated through time to generate the output hyper-lapse video. The output hyper-lapse video generated from the input video is smoothed relative to a traditional time-lapse video that includes every n-th frame of the input video.

At high speed-up rates, conventional frame sub-sampling coupled with traditional video stabilization techniques may be ineffective, because erratic camera shake present in the input video is amplified by the speed-up. In contrast, as part of the techniques set forth herein, an input camera path (e.g., input camera poses for input frames of the input video) can be reconstructed as well as dense, per-frame proxy geometries. Further, a smoothed camera path can be optimized for the output hyper-lapse video; the smoothed camera path can be computed to pass near input camera positions and to provide that the output camera is positioned and oriented in directions that can be rendered well from the input video. Moreover, the output hyper-lapse video can be generated by rendering, stitching, and blending selected source frames from the input video for each output frame.

An example of a type of input video (from which the output hyper-lapse video is generated) is a first-person video. A first-person video, for example, can be captured by a first-person camera. First-person cameras can operate hands-free and can capture the first-person video implicitly, rather than through explicit start-stop commands. The first-person camera can be worn or otherwise movable in concert with a user. Pursuant to an illustration, the first-person camera can be a helmet camera; however, other types of first-person cameras are intended to fall within the scope of the hereto appended claims. The first-person camera can capture the input video when the user is walking, running, climbing, hiking, riding (e.g., a bicycle, a vehicle, a train, etc.), skiing, skydiving, or otherwise moving through space; yet, the input video can include significant shake and/or twists and turns. It is to be appreciated, however, that the claimed subject matter is not limited to use of a first-person camera; rather, substantially any type of camera that can be held or moveable through space over time is intended to fall within the scope of the hereto appended claims. Further, other types of input video captured by a camera that is moving through space are intended to fall within the scope of the hereto appended claims.

Referring now to the drawings, FIG. 1 illustrates a system 100 that generates an output hyper-lapse video 102 from an input video 104. The system 100 includes a computing system 106. The computing system 106 includes a processor 108 and a memory 110. The processor 108 is configured to execute instructions loaded into the memory 110 (e.g., one or more systems loaded into the memory 110 are executable by the processor 108, one or more components loaded into the memory 110 are executable by the processor 108, etc.). As described in greater detail herein, the memory 110 includes a video generation system 112 that creates the output hyper-lapse video 102 from the input video 104, where the video generation system 112 is executable by the processor 108; thus, the memory 110 includes instructions configured to generate the output hyper-lapse video 102.

According to various examples, the computing system 106 can be or include a computing device. Pursuant to various illustrations, the computing device can be a desktop computing device, a mobile computing device (e.g., a laptop computing device, a mobile telephone, a tablet computing device, a wearable computing device, a handheld computing device, a portable gaming device, a personal digital assistant, a camera, etc.), a gaming console, an in-vehicle communications and infotainment system, or the like. In accordance with other examples, the computing system 106 can be or include one or more server computing devices. For instance, the computing system 106 can be or include one or more datacenters, where a datacenter includes a plurality of server computing devices. Additionally or alternatively, the computing system 106 can be a distributed computing system.

Moreover, the computing system 106 can include a data store 114. The data store 114 can retain the input video 104. The input video 104 includes a sequence of input frames. Further, the data store 114 can retain a model of a scene 116 and input camera poses 118 for the input frames of the input video 104. The model of the scene 116 can be a geometric (e.g., three-dimensional (3D)) model of the scene depicted in the input video 104. Further, the input camera poses 118 include input camera positions and input camera orientations of a camera that captured the input frames of the input video 104 (e.g., an input camera pose for a given input frame includes an input camera position and an input camera orientation for the given input frame, etc.). The input camera poses 118 are reconstructed from the input video 104. The input camera poses 118 for the input frames provide an estimate of motion of the camera that captured the input video 104. Although not shown, it is contemplated that the data store 114 can further retain the output hyper-lapse video 102 created by the video generation system 112.

According to an example, the computing system 106 can construct, based upon the input video 104, the model of the scene 116 and the input camera poses 118. Pursuant to another example, a disparate computing system can construct the model of the scene 116 and/or the input camera poses 118 (or portion(s) of one or both of the foregoing) based upon the input video 104; following this example, the disparate computing system can provide the model of the scene 116 and/or the input camera poses 118 (or the portion(s) thereof) to the computing system 106, which can thereafter be retained in the data store 114.

As noted above, the memory 110 of the computing system 106 includes the video generation system 112. The video generation system 112 includes a path plan component 120 that computes a smoothed camera path based upon the input video 104. The path plan component 120 can compute the smoothed camera path based upon the model of the scene 116 and the input camera poses 118 for the input frames of the input video 104. According to an example, the smoothed camera path computed by the path plan component 120 can include an output camera position curve and an output camera orientation curve. The path plan component 120 further selects output camera poses from the smoothed camera path for output frames of the output-hyper lapse video 102. An output camera pose for an output frame can include an output camera position and an output camera orientation.

The path plan component 120 can compute the smoothed camera path for the output hyper-lapse video 102 as a function of various factors. The factors used by the path plan component 120 to compute the smoothed camera path can include a length of the smoothed camera path, position smoothness of the smoothed camera path, orientation smoothness of the smoothed camera path, proximity of the smoothed camera path to the input camera positions for the input video 104, and a view quality metric indicative of image-based rendering quality from the model of the scene 116 along the smoothed camera path. The view quality metric, for example, can be a view-independent measure of an amount of foreshortening induced by texture-mapping an original image onto a proxy geometry; however, other view quality metrics are intended to fall within the scope of the hereto appended claims. Moreover, it is to be appreciated that the path plan component 120 can compute the smoothed camera path as a function of a subset of the foregoing factors. Additionally or alternatively, disparate factor(s) other than the above-noted factors can also be used by the path plan component 120 to compute the smoothed camera path.

The model of the scene 116 and the input camera poses 118 can be utilized by the path plan component 120 to optimize the smoothed camera path in six-dimensional (6D) pose space (x, y, z, pitch, yaw, roll). The path plan component 120 can compute the smoothed camera path based on the input camera poses 118 and an ability to render output frames of the output hyper-lapse video 102 from the input video 104. By being computed based upon the factors as described above, the smoothed camera path can be smooth in location and orientation, pass near input camera positions in the input video 104, and be oriented towards directions that can be rendered. Further, the path plan component 120 can select output camera poses from the smoothed camera path for the output frames of the output hyper-lapse video 102. In contrast to the foregoing, some conventional path smoothing techniques employ low-pass temporal filtering; however, due to the amount of smoothing utilized for time-lapse videos, such conventional algorithms typically fail to provide sufficient results.

The video generation system 112 further includes a render component 122 that renders the output hyper-lapse video 102. For an output frame of the output hyper-lapse video 102, the render component 122 chooses one or more selected input frames from the input video 104 for the output frame. The selected input frames can be chosen based at least in part upon an output camera pose for the output frame. For instance, the render component 122 can choose the selected input frames based upon an output camera position of the output frame, an output camera orientation of the output frame, or a combination of the output camera position and the output camera orientation of the output frame. Moreover, the render component 122 combines the selected input frames to render the output frame. The selected input frames can be combined by warping and blending data from the selected input frames. The render component 122 can project, stitch, blend, and/or otherwise fuse the selected input frames with per-frame proxy geometry. The render component 122 similarly chooses and combines selected input frames for the other output frames of the output hyper-lapse video 102.

To choose the selected input frames from the input video 104 for a given output frame, the render component 122 can compute weight maps for candidate input frames for the given output frame. The selected input frames can be chosen from the candidate input frames by the render component 122 as a function the weight maps. A weight map for a given candidate input frame can be based upon the view quality metric, relative depths of pixels (e.g., to mitigate selection of occluded parts of a scene), and amounts of motion blur. Accordingly, the render component 122 can implement a multi-frame image-based rendering algorithm that warps the input frames, computes the weight maps, adjusts for visibility, and blends resulting images using a temporal and spatial seam selection (e.g., graph cut) algorithm and Poisson blending.

Recovered input camera parameters (e.g., the input camera poses 118) and local world structure (e.g., the model of the scene 116) can be employed by the render component 122 as part of an image-based rendering technique to reconstruct each output frame of the output hyper-lapse video 102. The output frames can be synthesized from multiple input frames using image-based rendering. Thus, the render component 122 can combine several input frames to form each output frame, which can mitigate over-cropping. In contrast, many conventional video stabilization techniques commonly operate on a single-frame-in-single-frame-out basis, resulting in a significant amount of cropping.

According to various examples, the input video 104 can be a casually captured moving first-person video that includes motion noise. The video generation system 112 can handle the motion noise in the input video 104 to create the output hyper-lapse video 102. The output hyper-lapse video 102 can be a time-lapse video from a moving camera that is stabilized by the video generation system 112. In contrast, conventional time-lapse techniques may amplify the camera shake when speeding up the input video 104, and such camera shake may exceed capabilities of conventional video stabilization technologies. For instance, the increased camera shake can cause difficulty in tracking motion between successive frames. Moreover, applying conventional video stabilization techniques before decimating frames may be ineffective since such techniques often use relatively short time windows, so an amount of smoothing may be insufficient to achieve smooth hyper-lapse results.

According to an example, the video generation system 112 can speed up the input video 104 by a fixed factor (e.g., 10×, etc.) when creating the output hyper-lapse video 102 (e.g., the fixed factor can be predetermined by a manufacturer, user, etc.). By way of another example, it is contemplated that the video generation system 112 can speed up the input video 104 by a dynamically controlled factor (e.g., responsive to received input such as a speed value specified as part of user input, etc.).

Figure 2:
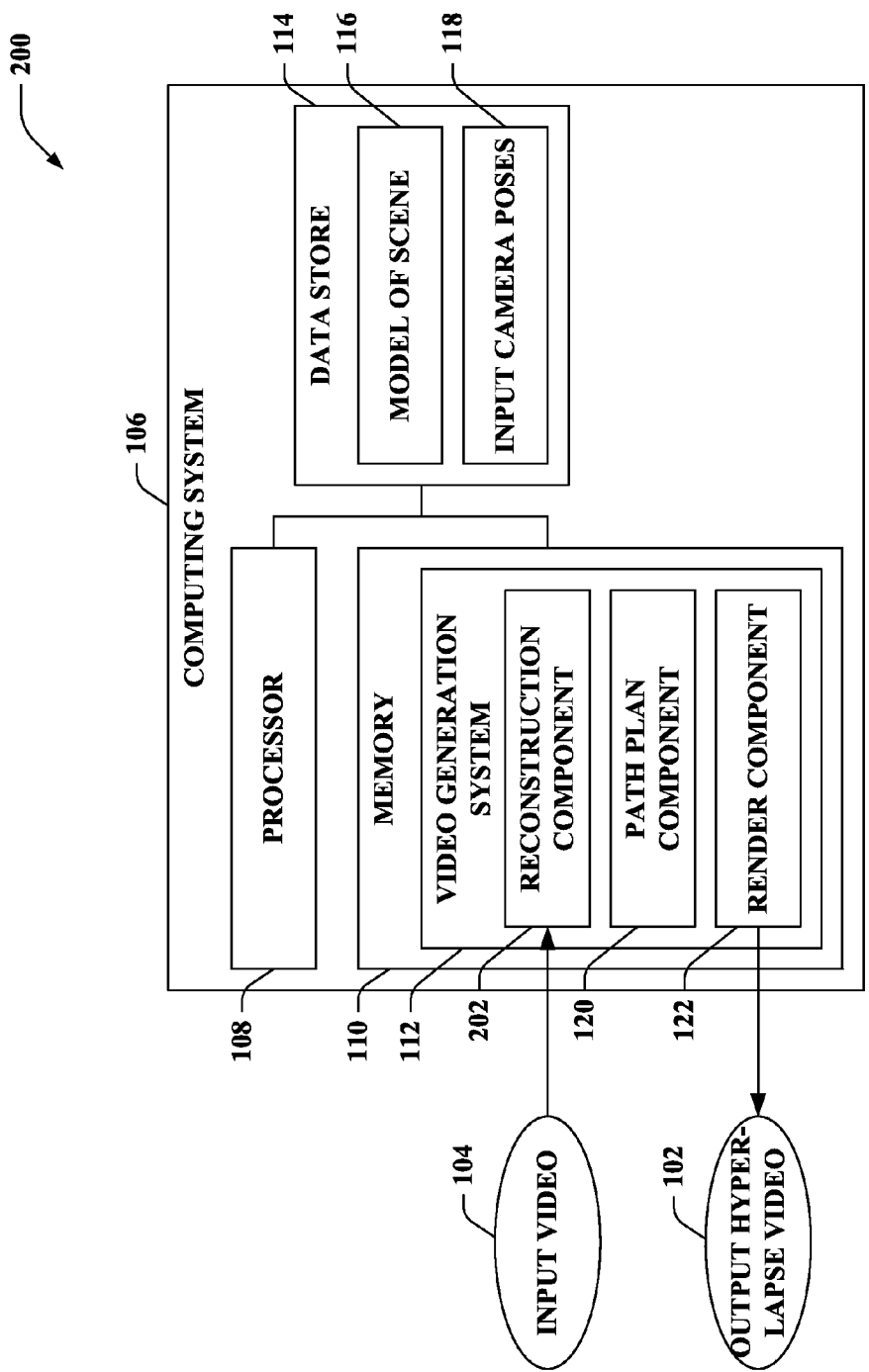
FIG. 2 illustrates a functional block diagram of an exemplary system that includes a computing system that reconstructs and uses a model of a scene and input camera poses for the input video to generate the output hyper-lapse video.

Now turning to FIG. 2, illustrated is a system 200 that includes the computing system 106, which reconstructs and uses the model of the scene 116 and the input camera poses 118 for the input video 104 to generate the output hyper-lapse video 102. Similar to above, the computing system 106 includes the processor 108, the memory 110, and the data store 114. The memory 110 further includes the video generation system 112. Although not shown, it is contemplated that the input video 104 and/or the output hyper-lapse video 102 can be retained in the data store 114.

In the example set forth in FIG. 2, the video generation system 112 includes a reconstruction component 202 as well as the path plan component 120 and the render component 122. The reconstruction component 202 constructs the model of the scene 116 and the input camera poses 118 for the input video 104. The reconstruction component 202 can use a structure-from-motion algorithm and dense depth map interpolation to construct the model of the scene 116 and the input camera poses 118.

According to an example, the reconstruction component 202 can build a 3D model of the world. Moreover, the reconstruction component 202 can compute per-frame 3D proxies (e.g., per-frame 3D proxies for the input frames of the input video 104), which can be used as part of image-based rendering described herein.

In order to compute 3D camera motions and scene proxies, structure-from-motion techniques can be utilized by the reconstruction component 202. More particularly, the reconstruction component 202 can use an incremental approach that adds well estimated cameras to the current 3D reconstruction. To handle a large dataset, the reconstruction component 202 can remove redundant input frames and then partition the input frames into overlapping blocks. In order to estimate continuous 3D proxies for each input frame, the reconstruction component 202 can interpolate a densified version of the 3D point cloud.

Figure 3:
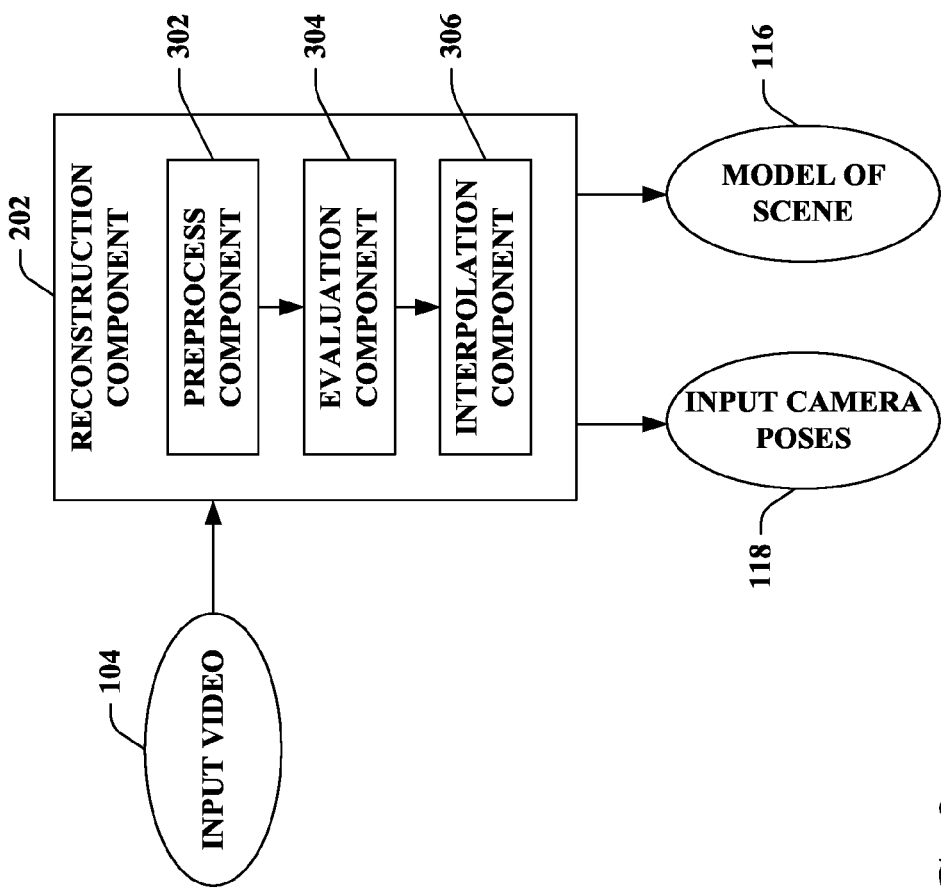
FIG. 3 illustrates a functional block diagram an exemplary reconstruction component of a video generation system.

With reference to FIG. 3, illustrated is the reconstruction component 202 of the video generation system 112. As noted above, the reconstruction component 202 can reconstruct both the model of the scene 116 (e.g., scene geometry) and the input camera poses 118 (e.g., input camera positions and orientations) for each input frame of the input video 104.

The reconstruction component 202 can optionally include a preprocess component 302 that preprocesses the input video 104. According to an example, a camera used to capture the input video 104 can capture video in a fish-eye projection with a diagonal field of view (e.g., some cameras can provide about a 170° diagonal field of view, etc.). The preprocess component 302 can calibrate lens distortion and convert the input video 104 to a (cropped) linear perspective projection. The change of projection can simplify implementation of subsequent processing while mitigating distorted corners of the fish-eye images. However, it is contemplated that the reconstruction component 202 need not include the preprocess component 302.

The reconstruction component 202 can further include an evaluation component 304. Once the images have been re-projected by the preprocess component 302 (if included in the reconstruction component 202 and employed), the evaluation component 304 can estimate extrinsic camera parameters of the input frames of the input video 104 as well as depth maps for the input images. The evaluation component 304 can solve for the estimated camera parameters and the depth maps using a structure-from-motion algorithm. The evaluation component 304 can utilize the structure-from-motion algorithm to estimate the location and orientation of the input cameras. In addition, the evaluation component 304 can employ the structure-from-motion algorithm to compute a sparse 3D point cloud, where each point has an associated list of input frames where it is visible.

When employing the structure-from-motion algorithm, the evaluation component 304 can find feature points in the input frames of the input video 104. The evaluation component 304 can further identify matching feature points in pairs of the input frames. Matching feature points in pairs of the input frames can be indicated in a match table. The evaluation component 304 can remove redundant input frames by searching for rows and columns in the match table that have significant off-diagonal components and removing these rows and columns from the original set of input frames of the input video 104. The evaluation component 304 can thereafter execute a remainder of the incremental structure-from-motion pipeline.

It is noted that it may be difficult to scale the incremental structure-from-motion algorithms. According to an example, to mitigate such difficulty, a dataset (e.g., the input video 104) can be divided into overlapping batches of input frames (e.g., 1400 frames each with 400 frames overlapping, etc.), where each batch can be separately reconstructed in parallel (e.g., by differing computing systems, by differing computing devices of a computing system, executed by differing processors or processor cores, etc.).

Subsequent to the parallel reconstruction of the batches, the evaluation component 304 can combine the batches into a single global coordinate system. The evaluation component 304 can compute a rigid alignment between pairs using Horn's method. Thus, the input cameras within overlap regions between batches can have two coordinates in the global coordinate system. The ambiguity can be resolved by linearly combining the coordinates, where a blending weight moves from 0 to 1 in an overlap region. Further, the evaluation component 304 can thereafter execute bundle adjustment on the global system. According to an example, after having obtained the full reconstruction, the evaluation component 304 can perform scaling so that an average distance between two consecutive input cameras is substantially 1. Thus, the evaluation component 304 can compute an estimated camera path and sparse 3D point cloud.

Moreover, the reconstruction component 202 can include an interpolation component 306 that performs dense depth map interpolation to construct the model of the scene 116 and the input camera poses 118. The reconstruction performed by the evaluation component 304 can be sparse, since the depth may be known at a few isolated points in each input frame. Accurately rendering a geometry of a frame from a novel viewpoint can be based upon dense depth maps or surface models. Thus, the interpolation component 306 can use interpolation techniques to obtain smooth proxy geometries.

The interpolation component 306 can increase a density of points within each input frame. For example, the interpolation component 306 can perform guided matching to increase the density of points within the input frames. Since an estimate of the input camera poses has been obtained, feature point matching can be executed again, but in a less conservative manner, since a feature point in one image can lie along an epipolar line in neighboring images. Thus, a feature point can match with other feature points nearby this line (e.g., a search radius of 10 pixels can be used to account for rolling shutter distortion). The foregoing can increase a likelihood of finding matches.

To robustly compute 3D points from feature matches, the interpolation component 306 can form tracks of features across multiple frames. According to an example, tracks can be computed by connecting pairwise matching feature points with common end-points, and then dropping tracks that loop back on themselves (e.g., that include more than one feature point in the same image). However, the approach set forth in the foregoing example may form and then reject many large tracks. By way of another example, the interpolation component 306 can use a greedy algorithm that builds tracks by successively merging feature matches, but only if the merge would not result in a track that includes two features in the same image. Moreover, the interpolation component 306 can triangulate a 3D point for every track by minimizing reprojection error. The foregoing can be represented as a non-linear least squares problem, which can be solved by the interpolation component 306 using the Levenberg-Marquardt algorithm.

Having increased the number of points, the interpolation component 306 can compute respective dense meshes the frames. A field of view can be divided into a regular grid mesh of w×h vertices (e.g., w can be set to 41 and h can be proportional to the inverse aspect ratio of the input video 104, etc.). Further, respective depths of vertices in a mesh can be computed by the interpolation component 306. However, since the reprojection error is related to disparity (inverse depth), the interpolation component 306 can solve for disparity, $d(x)$, for every vertex x, instead. Solving for disparity can enable mitigating numerical problems with distant parts of the scene (e.g., points at infinity). Thus, the objectives can be to approximate the sparse points where the depth is known and to be smooth elsewhere. This can be achieved by the interpolation component 306 solving the following optimization problem:

$$\min_{[d(x)]} \Sigma_{x \in V} E_{depth}(x) + \Sigma_{x \in V, y \in N(x)} E_{smooth}(x, y) \quad (1)$$

In the foregoing, V is the set of vertices, and N(x) is the 4-neighborhood of x. The unary term:

$$E_{depth}(x) = \Sigma_i B(x - p_i)(d(x) - z_i^{-1})^2 \quad (2)$$

measures the approximation error. $p_i$ and $z_i$ are the image space projection and depth of the sparse reconstructed points, and B is a bilinear kernel whose width is one grid cell. The binary term:

$$E_{smooth}(x,y) = \lambda (d(x) - d(y))^2 \quad (3)$$

encourages a smooth solution. $\lambda=1$ balances between both objectives. The solution to Equation 1 is a set of sparse linear equations, which can be solved using a standard solver.

Accordingly, the interpolation component 306 can output the input camera poses 118, which can include the input camera positions and orientations for each frame of the input video 104 as recovered. Further, the interpolation component 306 can output the model of the scene 116, which can include a depth map in the form of a dense rectangular grid of points for each frame.

As an alternative to the techniques set forth above, it is contemplated that the reconstruction component 202 can perform global 3D reconstruction. For instance, the reconstruction component 202 can apply a 3D reconstruction algorithm such as Clustering Views for Multi-view Stereo (CMVS) and/or Patch-based Multi-view Stereo (PMVS) to the input video 104. Such model can then be rendered along the output camera path as described herein. However, it is to be appreciated that the claimed subject matter is not so limited.

Figure 4:
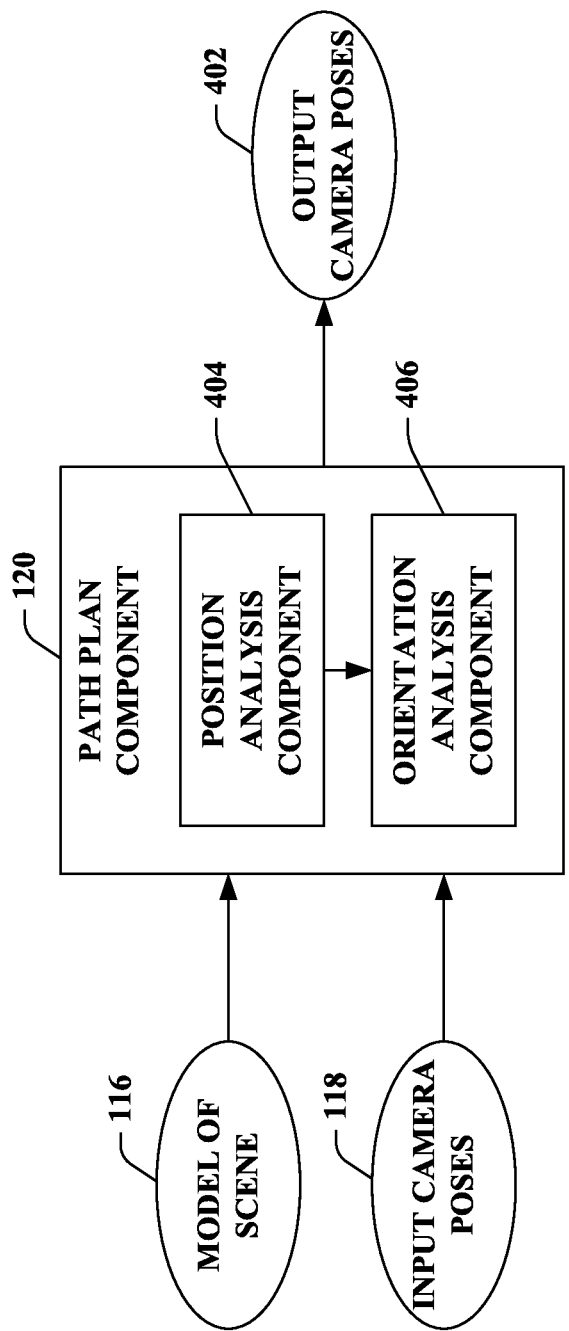
FIG. 4 illustrates a functional block diagram of an exemplary path plan component of the video generation system.

With reference to FIG. 4, illustrated is the path plan component 120 of the video generation system 112. As noted above, the path plan component 120 can compute a smoothed camera path based upon the model of the scene 116 and the input camera poses 118 for the input video (e.g., the input video 104). Further, the path plan component 120 can select output camera poses 402 from the smoothed camera path for output frames of the output hyper-lapse video (e.g., the output hyper-lapse video 102).

The path plan component 120 can generate the smoothed camera path while satisfying conflicting objectives. For instance, the path computed by the path plan component 120 can be smooth and can approximate an input camera path (e.g., follows near the input camera poses 118). Further, the path may be oriented towards directions that can be rendered well using image-based rendering. In contrast to the techniques employed by the path plan component 120, traditional path smoothing algorithms commonly fail to produce sufficient results for shaky input camera paths.

As set forth above, the path plan component 120 can compute the smoothed camera path for the output hyper-lapse video 102 as a function of factors such as a length of the smoothed camera path, position smoothness of the smoothed camera path, orientation smoothness of the smoothed camera path, proximity of the smoothed camera path to the input camera positions for the input video, and a view quality metric indicative of image-based rendering quality from the model of the scene 116 along the smoothed camera path. Thus, path planning performed by the path plan component 120, for example, can be formulated as an optimization problem that tries to simultaneously satisfy the following objectives:

1. Length: The path should be no longer than necessary.
2. Smoothness: The path should be smooth both in position and orientation.
3. Approximation: The path should be near the input cameras.
4. Rendering quality: The path should have well estimated proxy geometry in view for image-based rendering.

The foregoing objectives are formalized as follows. Let $\{p_k^{in}, R_k^{in}\}$ be the set of input camera positions and rotation matrices (e.g., the input camera poses 118), and let $p(t)$ and $f(t)$ be the desired output camera continuous position and orientation curves, respectively. The smoothed camera path computed by the path plan component 120 includes $p(t)$ and $f(t)$. $f(t)$ is represented as a unit front vector (e.g., it has two degrees of freedom). The remaining right and up vectors can be defined by taking cross products with a global world up vector. A field of view of the output camera can be assumed to be a fixed user-supplied parameter (e.g., 80% of a field of view of the input camera, etc.).

The length and smoothness objectives can be stated mathematically as penalty terms:

$$E_{length} = \int \|p'(t)\|^2 dt \quad (4)$$

$$E_{smooth-p} = \int \|p''(t)\|^2 dt \quad (5)$$

$$E_{smooth-f} = \int \|f''(t)\|^2 dt \quad (6)$$

For the approximation objective, the distance of input camera positions to corresponding closest points on the path can be minimized as follows:

$$E_{approx} = \Sigma_k \min_t \|p_k^{in} - p(t)\|^2 \quad (7)$$

Further, the rendering quality may depend on the scene geometry as well the input camera positions. A view quality metric can be computed by the path plan component 120, where the view quality metric estimates the rendering quality that can be achieved using image-based rendering given a particular output camera position and orientation. Let $\varphi_k$ (x, y, t), defined below, be a penalty when using the proxy of input camera k to render the pixel (x, y) at time t. The following expression can be evaluated to measure the expected quality for a particular output frame at time t by integrating over the image space:

$$\Phi(t) = \int \int \min_k \varphi_k(x, y, t) dx dy \quad (8)$$

The foregoing penalty can be integrated over the length of the curve to obtain a rendering quality penalty term:

$$E_{quality} = \int \Phi(t) dt \quad (9)$$

Various definitions of $\varphi_k$ are intended to fall within the scope of the hereto appended claims. According to an example, the Unstructured Lumigraph angular error can be used for $\varphi_k$ as follows:

$$\varphi_k^{ULG} = \cos^{-1}(\hat{s} \cdot \hat{u}) \quad (10)$$

In the foregoing, $$\hat{s} = \frac{c_k(x, y, t) - p_k^{in}}{\|c_k(x, y, t) - p_k^{in}\|}, \hat{u} = \frac{c_k(x, y, t) - p(t)}{\|c_k(x, y, t) - p(t)\|} \quad (11)$$

ŝ and û denote unit direction vectors between camera centers and a proxy surface point $c_k$ (x, y, t). The proxy surface point denotes an intersection of the ray for a pixel (x, y, t) with the geometry of the proxy for input camera k. However, the Unstructured Lumigraph angular error may be invariant to obliqueness of the projection onto the proxy, and can therefore associate distorted views with low penalties.

Figure 5:
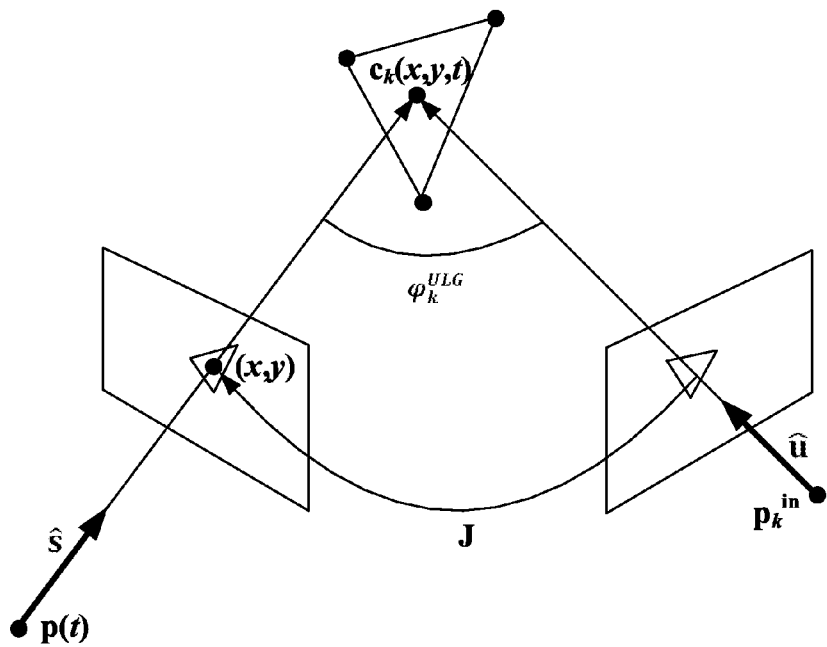
FIG. 5 illustrates an exemplary computation of a rendering quality term $\varphi_k^{ULG}$.

FIG. 5 illustrates computation of the rendering quality term $\varphi_k^{ULG}$ in the above example. The Unstructured Lumigraph angular error $\varphi_k^{ULG}$ measures an angle between direction vectors ŝ and û respectively from an output camera center p(t) and an input camera center $p_k^{in}$ to the proxy surface point $c_k$ (x, y, t). An affine transformation J can be used to compute a texture stretch $\varphi_k^{TS}$ at the reference pixel (x, y), but can depend on orientation of the output camera.

Again, reference is made to FIG. 4. According to an example, another measure of $\varphi_k$ can directly penalize an amount of texture stretch of the projection:

$$\varphi_k^{TS} = 1 - \frac{\min_i \sigma_i^J}{\max_i \sigma_i^J} \quad (12)$$

In the foregoing, $\sigma_i^J$ are the eigenvalues of the Jacobian of the texture coordinates:

$$J = \begin{bmatrix} \frac{\partial u}{\partial x} & \frac{\partial u}{\partial y} \\ \frac{\partial v}{\partial x} & \frac{\partial v}{\partial y} \end{bmatrix} \quad (13)$$

The Jacobian can be evaluated in a pixel shader using the dFdx/dFdy instructions, and the Eigenvalues for a 2×2 matrix can be computed using a closed form expression.

The aforementioned texture stretch based measure is not invariant to the view orientation, since in a perspective projection, the periphery of an image is more stretched than the center. However, it may be preferable to have a measure that does not change as the viewpoint is rotated, which can enable more efficient optimization of the objective.

Pursuant to another example, a view-independent measure of an amount of foreshortening induced by texture mapping an original image onto a proxy geometry can be used as $\varphi_k$. Such measure may be invariant as a viewpoint is rotated. The view-independent measure can be based upon a stretch of directions (e.g., 3D unit vectors) rather than perspective projected 2D texture coordinates.

Figure 6:
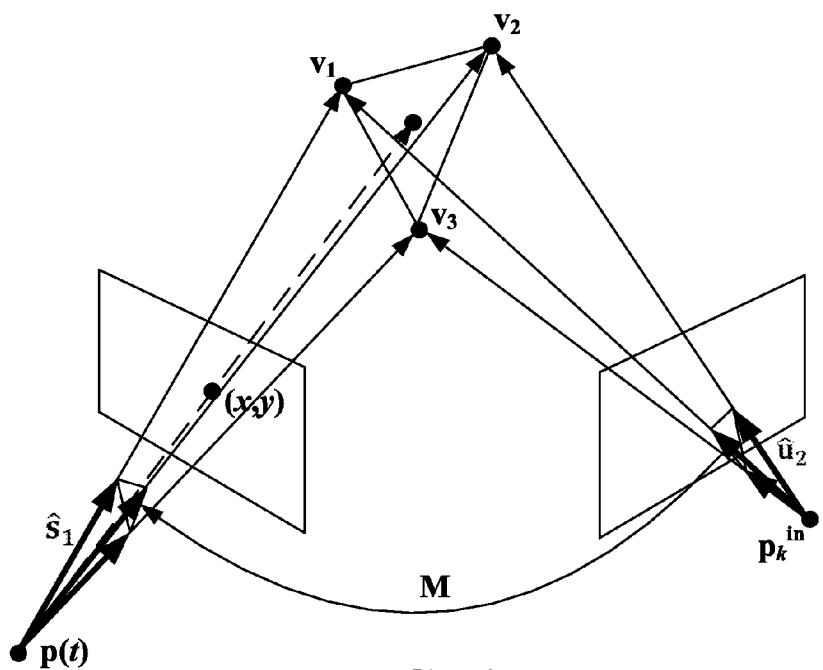
FIG. 6 illustrates an exemplary computation of a rendering quality term $\varphi_k^{TS3}$, which is a view invariant texture stretch.

FIG. 6 illustrates computation of an exemplary view-independent measure. A view invariant texture stretch measure can be represented as $\varphi_k^{TS3}$. The view invariant texture stretch measure $\varphi_k^{TS3}$ can be computed using a condition number of a 3×3 mapping M between unit normals $\hat{s}_i$ and $\hat{u}_i$ pointing from camera centers to vertices $v_i$ of a proxy triangle.

Let $v_1$, $v_2$, $v_3$ be the vertices of the proxy triangle. The directions can be defined with respect to the input and output camera positions as:

$$\hat{s}_i = \frac{v_i - p_k^{in}}{\|v_i - p_k^{in}\|}, \hat{u}_i = \frac{v_i - p(t)}{\|v_i - p(t)\|} \quad (14)$$

Accordingly, a linear mapping $M=SU^{-1}$ can be defined, where S=($\hat{s}_1$, $\hat{s}_2$, $\hat{s}_3$), U=($\hat{u}_1$, $\hat{u}_2$, $\hat{u}_3$). Thus, the penalty function can be:

$$\varphi_k^{TS3} = 1 - \frac{\min_i \sigma_i^M}{\max_i \sigma_i^M} \quad (15)$$

where $\sigma_i^M$ are the eigenvalues of M.

Reference is again made to FIG. 4. A weighted sum of the above-noted objectives can provide a combined objective for path planning performed by the path plan component 120:

$$E = \lambda_1 E_{length} + \lambda_2 E_{smooth-p} + \lambda_3 E_{smooth-f} + \lambda_4 E_{approx} + \lambda_5 E_{quality} \quad (16)$$

In the foregoing, $\lambda_1$, $\lambda_2$, $\lambda_3$, $\lambda_4$, and $\lambda_5$ represent balancing coefficients. According to an example, the following values can be used for the balancing coefficients: $\lambda_1=100$, $\lambda_2=100$, $\lambda_3=1000$, $\lambda_4=0.1$, $\lambda_5=0.01$ (e.g., the scale of the reconstructed scene can be normalized); yet, the claimed subject matter is not limited to the foregoing example.

Directly optimizing Equation 16 may be expensive, since the view quality metric ($E_{quality}$) may be expensive to evaluate. According to an example, tractability of the optimization can be increased by factoring the optimization into two stages. Thus, the path plan component 120 can employ a two-stage algorithm for optimizing the global metric; the two-stage algorithm can enhance efficiency of the optimization. Moreover, according to an example, as part of the two-stage algorithm, the view quality metric can be pre-computed and retained in one or more lookup tables (e.g., retained in the data store 114).

More particularly, in the first stage, the path plan component 120 can optimize the output camera position curve p(t) of the smoothed camera path while ignoring the energy terms that depend on the orientation f(t). While this reduced objective is nonlinear, it can be optimized by iteratively solving sparse linear subproblems. Next, in the second stage, the path plan component 120 can optimize the output camera orientation curve f(t), while the previously computed output camera position curve p(t) can remain fixed. The two-stage algorithm can enhance efficiency. Moreover, a view quality metric that is rotation invariant, such as the view invariant texture stretch measure $\varphi_k^{TS3}$, can be used; accordingly, the minimum expression in Equation 8 can be pre-computed once for possible orientations of the output cameras.

The path plan component 120 can include a position analysis component 404 that computes the output camera position curve p(t) of the smoothed camera path in the first stage. The position analysis component 404 can compute the output camera position curve p(t) as a function of the length of the smoothed camera path, the position smoothness of the smoothed camera path, and the proximity of the smoothed camera path to the input camera positions for the input video. Thus, the output camera position curve p(t) can be computed as a function of position based objectives. The position analysis component 404 can optimize the output camera position curve p(t) by minimizing the objectives $E_{length}$, $E_{smooth-p}$, and $E_{approx}$, which may be independent of the orientation. According to an example, p(t) can be represented as a cubic B-spline curve, with the number of control vertices set to 5% of the number of input frames. The reduced objective can be represented as follows (omitting the balancing coefficients $\lambda_*$ for clarity):

$$E_{location} = \Sigma_k \|p_k^{in} - p(t_k)\|^2 + \int \|p'(t)\|^2 + \int \|p''(t)\|^2 \quad (17)$$

In the foregoing, $t_k = \arg\min_t \|p_k^{in} - p(t)\|$ is the parameter of the closest curve point to camera k.

While this may be a non-linear objective, it can be efficiently solved by the position analysis component 404 using an iterative algorithm. Note that the two integral terms in Equation 17 have quadratic closed-form expressions for cubic B-splines. As part of the iterative algorithm, the position analysis component 404 can fix $t_k$ during one iteration, which turns Equation 17 into a quadratic problem that can be optimized by solving a sparse linear set of equations. Thus, the position analysis component 404 can alternately optimize Equation 17 and update $t_k$.

Further, the position analysis component 404 can select output camera positions along the output camera position curve p(t) of the smoothed camera path for output frames of the output hyper-lapse video. Having determined the continuous output camera position curve p(t) that satisfies the objectives aside from orientation, the position analysis component 404 can select output camera positions along such curve. The parameter t can be dropped and the subscript i can be introduced to refer to output frames. The curve samples can be the output camera positions of the output hyper-lapse video.

According to an example, the output camera positions selected by the position analysis component 404 can be evenly spaced along the smoothed camera path (e.g., the output camera position curve) in arc-length. Following this example, by sampling the output camera position curve into a desired number of output frames at evenly spaced output camera positions along the curve in arc-length, a constant velocity along the smoothed camera path in the output hyper-lapse video can result.

By way of another example, the output camera positions selected by the position analysis component 404 can be spaced based upon input camera velocities from the input video. The input camera velocities can be a function of the input camera poses 118 for the input frames of the input video. According to this example, some (or all) of the input camera velocities can be preserved in the output hyper-lapse video. The position analysis component 404 can use a mapping of the input frames to corresponding $t_k$ values (Equation 17) to compute a dynamic time warp. Further, the position analysis component 404 can sample a curve that maps from input frame numbers (e.g., on a horizontal axis) to the corresponding $t_k$ values (e.g., on a vertical axis) at regular (horizontal) intervals; such sampling can provide a set of non-uniformly spaced t samples that are denser in time when the input camera was slower or stopped.

Pursuant to yet another example, the position analysis component 404 can blend between a constant velocity and an adaptive velocity.

The path plan component 120 can also include an orientation analysis component 406 that optimizes the output camera orientation curve f(t) as part of the second stage of the two-stage algorithm with the previously computed output camera position curve p(t) remaining fixed. The orientation analysis component 406 can compute the output camera orientation curve f(t) as a function of the orientation smoothness of the smoothed camera path and the view quality metric. Thus, the output camera orientation curve f(t) can be computed subsequent to computation of the output camera position curve p(t) as a function of orientation based objectives. The orientation analysis component 406 can optimize the output camera orientation curve f(t) by minimizing the $E_{smooth-f}$ and $E_{quality}$ terms. The new objective can be represented as follows (again, quality balancing coefficients $\lambda$, dropped for clarity):

$$E_{orientation} = \Sigma_i \Phi_i(f_i) + \Sigma_i \|2f_i - f_{i-1} - f_{i+1}\|^2 \quad (18)$$

The orientation analysis component 406 can pre-compute the view quality metric. According to an example, a lookup table (cube map) that includes pre-computed $\Phi_i(f)$ can be generated by the orientation analysis component 406 for each output camera i. Pre-computation of the lookup tables can enhance efficiency of the optimization performed by the orientation analysis component 406. Thus, at output camera position $p_i$ (for each output camera i), the orientation analysis component 406 can render proxy geometries using an appropriate shader. The orientation analysis component 406 can further set a blending mode to compute a minimum in a frame buffer. Repeating this process in each of the six cardinal directions can produce a cube map that stores:

$$\varphi_i(f) = \min_k \varphi_k(f, i) \quad (19)$$

Next, the orientation selection component 406 can compute image integrals for the $\Phi_i(f)$ image-based rendering (IBR) fitness terms using the pre-computed quantities:

$$\Phi_i(f) = \iint_{I(f)} \hat{\varphi}_i(f') df' \quad (20)$$

In the foregoing, I(f) indicates a set of rays f' that are in an image I. Again, results can be stored in cube maps. This operation can reduce evaluation of the first term in Equation 18 to a cube map texture fetch, and thus, can enhance efficiency of minimizing Equation 18. For instance, a non-linear conjugate gradient with golden section line search can be used for such optimization; yet, the claimed subject matter is not so limited.

According to various examples, it is contemplated that alternative path planning techniques can additionally or alternatively be employed by the path plan component 120. Examples of such techniques include low-pass smoothing of the input camera poses 118, Taubin's method, or a variant of low-pass filtering that employs a pull-back term (e.g., to mitigates a curve from moving too far away from an input curve). Yet, the claimed subject matter is not limited to the foregoing examples.

Figure 7:
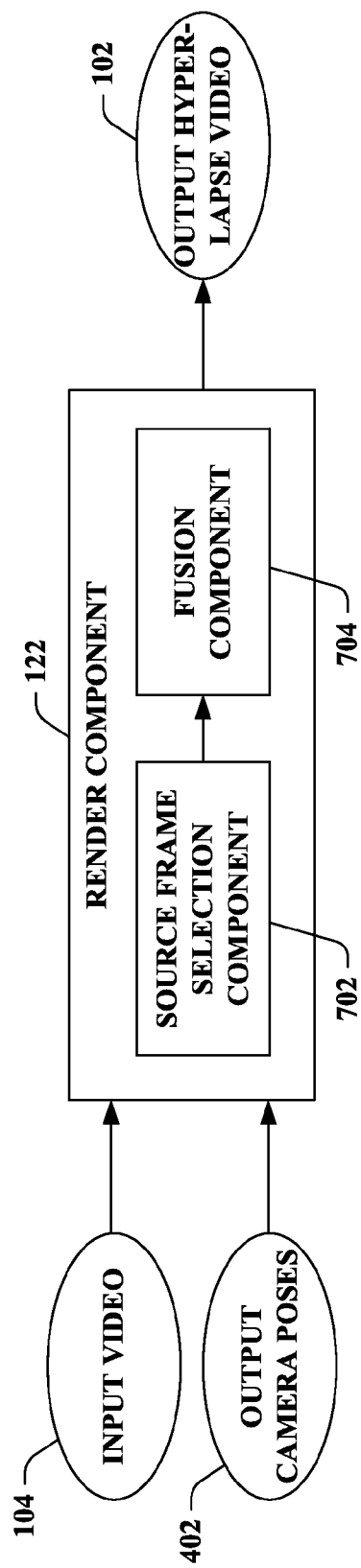
FIG. 7 illustrates a functional block diagram of an exemplary render component of the video generation system.

Turning to FIG. 7, illustrated is the render component 122 of the video generation system 106. The render component 122 renders the output frames of the output hyper-lapse video 102, where the output frames are rendered based upon the output camera poses 402 (e.g., the output camera positions and orientations) determined by the path plan component 120. The render component 122 can include a source frame selection component 702 that chooses respective sets of selected input frames from the input video 104 for the output frames based at least in part upon the output camera poses 402 for the output frames. The source frame selection component 702, for example, can use a greedy algorithm to choose selected input frames from which to assemble an output frame. Moreover, the render component 122 can include a fusion component 704 that combines the selected input frames in the respective sets to render the output frames of the output hyper-lapse video 102. The fusion component 704 can stitch and blend the selected input frames to render the output frame for each of the output frames of the output hyper-lapse video 102. The selected input frames, for example, can be stitched and blended by the fusion component 704 using a temporal and spatial seam selection algorithm and Poisson blending.

For every output frame, the source frame selection component 702 can choose input frames, which, when re-projected using their proxy geometry, cover a field-of-view of the output frame with acceptable quality. The selected input frames can be chosen by the source frame selection component 702 to enhance efficiency of rendering the output frame and mitigate popping, which may occur if each pixel were to be chosen from a different input frame.

The source frame selection component 702 can choose selected input frames for an output frame as described below. It is to be appreciated that the following can be repeated for each of the output frames of the output hyper-lapse video 102. The source frame selection component 702 can identify candidate input frames for the output frame (e.g., the candidate input frames being identified from the input frames of the input video 104). The candidate input frames for the output frame can include a nearest input frame (e.g., having an input camera position closest to an output camera position of the output frame) and predetermined number(s) of the input frames prior and subsequent to the nearest input frame in the sequence of the input frames forming the input video 104. According to an example, the candidate input frames can include ±500 input frames around the nearest input frame in the sequence; yet, the claimed subject matter is not so limited.

Further, the source frame selection component 702 can generate respective weight maps for the candidate input frames, where:

$$w_{k,i}(x, y) = \text{clamp}\left(\frac{\varphi_{k,i}(x, y) - \tau_{min}}{\tau_{max} - \tau_{min}}, 0, 1\right) \quad (21)$$

denotes a weight for using proxy k for output frame i. $\tau_{max}$ is an upper threshold above which a quality of the proxy is considered to be sufficient, and $\tau_{min}$ is a lower threshold below which the quality of the proxy is considered to be too low to be used for rendering. Example values of these thresholds can be $\tau_{max}=0.7$ and $\tau_{min}=0.3$; however, the claimed subject matter is not so limited. For pixels that are not covered by the proxy, $w_{k,i}=0$ can be set.

Further, the source frame selection component 702 can choose the selected input frames for the output frame from the candidate input frames based upon the weight maps using a greedy algorithm. When executing the greedy algorithm, the source frame selection component 702 can initially choose a selected input frame from the candidate input frames that provides a highest overall quality:

$$s_0 = \underset{k}{\text{argmax}}\, \Sigma_{x,y}(x, y) \quad (22)$$

Thereafter, the source frame selection component 702 can iteratively choose selected input frames from the candidate input frames that respectively provide the most improvement over a previously selected subset:

$$s_n = \underset{k}{\text{argmax}}\, \Sigma_{x,y}(0, w_k(x, y) - a_n(x, y)) \quad (23)$$

In the foregoing, $a_n$ is an accumulation buffer that includes a previously selected maximum value for every pixel:

$$a_n(x, y) = \max_{m<n} w_{s_m}(x, y) \quad (24)$$

The source frame selection component 702 can continue choosing the selected input frames until an average improvement per pixel in Equation 23 falls below a threshold value (e.g., the threshold value can be set to 0.1, etc.).

According to various examples, it is contemplated that the source frame selection component 702 can adjust the weight maps for the candidate input frames based upon a per-pixel blur measure and/or pixel occlusion. For instance, some input frames may be poor because of camera shake-induced motion blur. Let $b_k(x, y)$ be a per-pixel blur measure, which can be obtained by low-pass filtering the gradient magnitude of the texture of image k. Accordingly, the source frame selection component 702 can replace the weights in the weight maps (as computed above) with the following weights:

$$\tilde{w}_k = \frac{w_k b_k}{\max_l b_l} \quad (25)$$

Additionally or alternatively, relative depths of pixels can be taken into account to mitigate selecting occluded parts of a scene. Thus, the source frame selection component 702 can render depth maps along with the weight maps, and depth samples can be evaluated for the pixels. Pixels that are occluded can be discarded; however, a strict z-buffer may not be usable due to accounting for inaccuracies in the reconstructed depths. Rather, a Gaussian mixture model can be applied to these samples. A number of Gaussians can be determined using the Bayesian information criterion. The foregoing can provide a classification of the depths into one or several layers. Accordingly, the source frame selection component 702 can set weights of pixels not on a front layer to zero in the weight maps.

By way of example, when employing the above algorithm, the source frame selection component 702 can select on average 3 to 5 input frames for every output frame. While this is done independently for the output frames, similar input frames may be selected for nearby output frames, which can enable enhancing temporally coherent results during rendering.

According to an example, temporal coherence can further be enhanced by allowing selected input frames for an output frame to also be used during rendering (e.g., by the fusion component 704) for surrounding output frames in a frame window (e.g., ±8 frames relative to the output frame in a sequence of frames that forms the output hyper-lapse video 102). When used for the surrounding output frames, the weight maps can be multiplied with a global attenuation coefficient that linearly drops to zero at edges of the frame window (e.g., the ±8 frame window). The attenuation can assist in mitigating popping artifacts in stitching. Thus, by way of illustration, the render component 122 (e.g., the fusion component 704) can combine selected input frames for an output frame and selected input frames chosen for output frames that surround the output frame in a frame window to render the output frame.

Further, the fusion component 704 combines the selected input frames in the respective sets to render the output frames of the output hyper-lapse video 102. The fusion component 704 can render selected source images, stitch results together using a Markov random field (MRF), and reconstruct final images in the gradient domain. As noted above, the fusion component 704 can stitch and blend the selected input frames to render the output frames. The selected input frames, for example, can be stitched and blended by the fusion component 704 using a temporal and spatial seam selection algorithm and Poisson blending.

The fusion component 704 can optimize a discrete pixel labeling. The fusion component 704 can choose, for each (space-time) pixel p in the output hyper-lapse video 102, a label $\alpha_p$ from one of the rendered source proxies that have been selected for that particular output frame. The objective can be defined as follows:

$$\min_{[\alpha_p]} \Sigma_p E_d(p, \alpha_p) + \lambda_{s-s} \Sigma_{p,q \in N(p)} E_s(p, q, \alpha_p, \alpha_q) + \\ \lambda_{s-t} \Sigma_{p,q \in T(p)} E_s(p, q, \alpha_p, \alpha_q) \quad (26)$$

In the above, the "data" term $E_d(p, \alpha_p) = 1 - w_{\alpha_p}(p)$ encourages selecting high quality pixels and the "smoothness" terms $E_s$, defined below, encourage invisible stitch seams. According to an example, $\lambda_{s-s} = 10$ and $\lambda_{s-t} = 0.1$ can be used; however, the claimed subject matter is not so limited. Further, N(p) denotes the set of 4-neighbors within the same output frame, and T(p) denotes the two temporal neighbors in the previous and next frames, which generally will not lie at the same pixel coordinates, and which can be obtained by computing a medoid of motion vectors of candidate proxies at the given pixel.

The smoothness terms can be defined as follows:

$$E_s(p, q, \alpha_p, \alpha_q) = \|t_{\alpha_p}(p) - t_{\alpha_q}(p)\| + \|t_{\alpha_p}(q) - t_{\alpha_q}(q)\| \quad (27)$$

In the above, $t_{\alpha_p}(p)$ denotes the RGB value of the rendered proxy at pixel p. Equation 26 can be solved using the alpha expansion algorithm in a coarse-to-fine manner.

The optimized labeling can assist in hiding visible seams. However, there may be color differences because of exposure and white balancing changes in the source frames. The fusion component 704 can balance out these differences by solving a spatio-temporal Poisson reconstruction problem to obtain final pixels r:

$$\min_r \Sigma_p \lambda_{b-d} (r(p) - t_{\alpha_p}(p))^2 + \\ \lambda_{b-s} ((\Delta_x r(p) - \Delta_x t_{\alpha_p}(p))^2 + (\Delta_y r(p) - \Delta_y t_{\alpha_p}(p))^2) + \\ \lambda_{b-t} (\Delta_t r(p) - \Delta_t t_{\alpha_p}(p))^2 \quad (28)$$

As set forth above, $\Delta_x$, $\Delta_y$, $\Delta_t$ denote the horizontal, vertical, and temporal finite forward difference operator, respectively. $\lambda_{b-d} = 0.001$, $\lambda_{b-s} = 1$, and $\Delta_{b-t} = 0.01$ can be used as balancing coefficients; however, other values of the balancing coefficients are intended to fall within the scope of the hereto appended claims. Equation 28 can be solved using a standard conjugate gradients solver.

Figure 8:
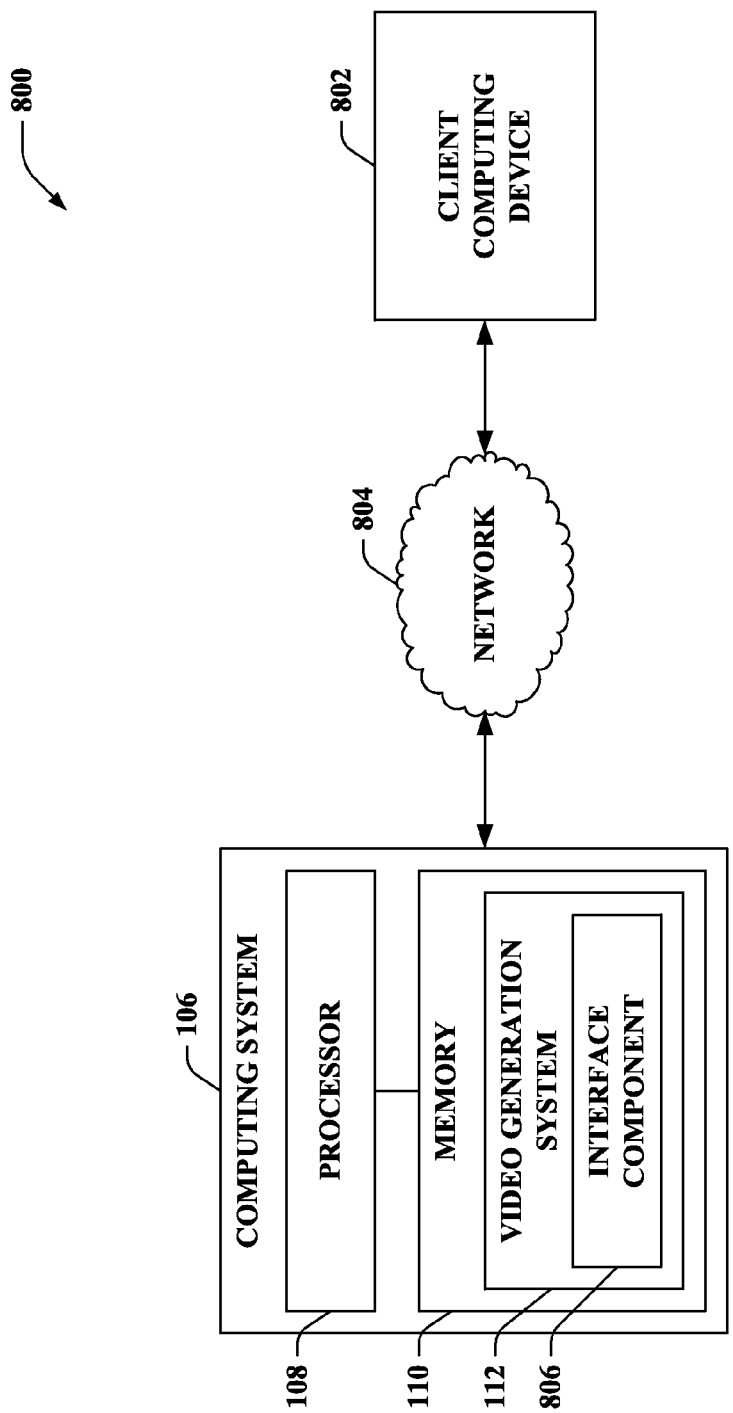
FIG. 8 illustrates a functional block diagram of an exemplary system that generates an output hyper-lapse video from an input video.

With reference to FIG. 8, illustrated is a system 800 that generates an output hyper-lapse video from an input video. The system 800 includes the computing system 106, which further includes the processor 108 and the memory 110. As described herein, the memory 110 can include the video generation system 112 (or a portion thereof). Although not shown, it is contemplated that the computing system 106 can further include the data store 114.

The system 800 further includes a client computing device 802 that is in communication with the computing system 106 by way of a network 804. By way of example, the network 804 can be the Internet, a cellular network, a local area network, a combination thereof, or the like. Yet, it is contemplated that substantially any network type is intended to fall within the scope of the hereto appended claims.

According to an example, the client computing device 802 can be a mobile computing device that includes an image sensor. Thus, the client computing device 802 can be moved through space over time to capture the input video using the image sensor. Examples of such a mobile computing device can include a camera (e.g., a first-person camera, a handheld camera, etc.), a laptop computing device, a mobile telephone, a tablet computing device, a wearable computing device, a handheld computing device, a portable gaming device, a personal digital assistant, or the like.

Pursuant to another example, the client computing device 802 can be in communication with a disparate computing device, where the disparate computing device can be moved through space over time to capture the input video. Following this example, the client computing device 802 can receive the input video from the disparate computing device. Accordingly, the client computing device 802 can be, for example, a desktop computing device, a mobile computing device, a gaming console, an in-vehicle communications and infotainment system, a server computing device (or plurality of server computing devices), or the like.

The client computing device 802, for example, can transmit the input video over the network 804 to the computing system 106. The video generation system 112 can further include an interface component 806 that receives the input video from the client computing device 802 by way of the network 804. As described herein, the video generation system 112 can create the output hyper-lapse video from the input video. Moreover, the interface component 806 can transmit the output-hyper lapse video to the client computing device 802 (and/or a differing client computing device) by way of the network 804. Additionally or alternatively, the output hyper-lapse video generated by the video generation system 112 can be retained in a data store (e.g., the data store 114) of the computing system 106.

Pursuant to another example, it is contemplated that the client computing device 802 can include a portion of the video generation system 112. Thus, the video generation system 112 can be distributed across the client computing device 802 and the computing system 106. Accordingly, portions of the video generation system 112 can be implemented in various locations, which can enable reducing an amount of data transmitted over the network 804. By way of illustration, part of the processing can be performed on the client computing device 802 prior to uploading processed data to the computing system 106.

The computing system 106, according to an example, can receive input videos from a plurality of client computing devices (e.g., the client computing device 802, other client computing devices similar to the client computing device 802) via the network 804. Pursuant to an illustration, the video generation system 112 can share information between input videos from disparate sources (e.g., share data from differing input videos at corresponding input camera positions between the input videos, etc.).

Figure 9:
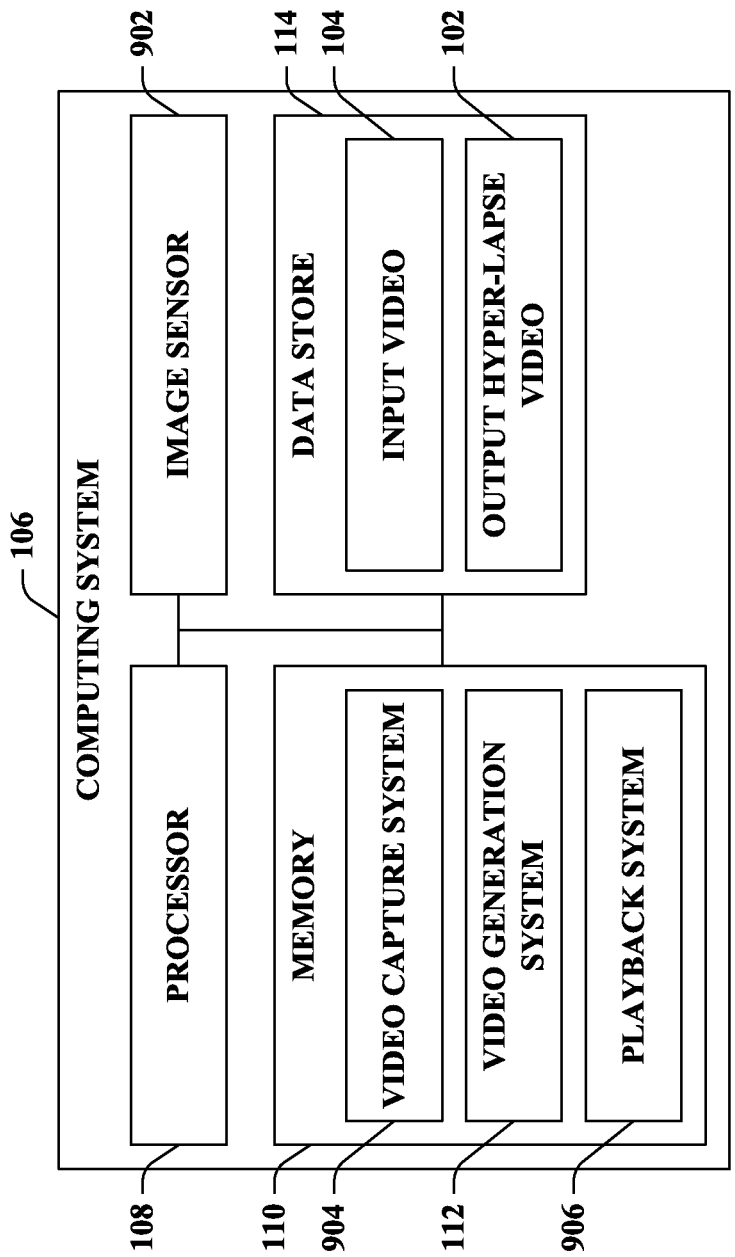
FIG. 9 illustrates a functional block diagram of an exemplary computing system.

Turning to FIG. 9, illustrated is an example of the computing system 106. Again, the computing system 106 can include the processor 108, the memory 110, and the data store 114.

In the example set forth in FIG. 9, the computing system 106 can be a mobile computing device that can be moved through space over time to capture the input video 104. More particularly, the computing system 106 can include an image sensor 902. Further, the memory 110 of the computing system 106 can include a video capture system 904 that is executable by the processor 108. The video capture system 904 can store output data from the image sensor 902 in the data store 114 as the input video 104.

The memory 110 of the computing system 106 further includes the video generation system 112. As set forth herein, the video generation system 112 can create the output hyper-lapse video 102 from the input video 104. Moreover, the video generation system 112 can store the output hyper-lapse video 102 in the data store 114.

The memory 110 of the computing system 106 can further include a playback system 906 that can play the output hyper-lapse video 102. For instance, the playback system 906 can display the output hyper-lapse video 102 on a display screen of or coupled with the computing system 106.

Pursuant to an illustration, the playback system 906 can cause a map of a camera path to be displayed on a display screen; following this illustration, user input can be received by the playback system 906 that manipulates an indicator along the camera path, thereby controlling speed up of the input video 104 in the output hyper-lapse video 102 (e.g., the output hyper-lapse video 102 can replay the input video 104 as sped up responsive to the user input, the user input can control moving forwards or backwards along a timeline of the input video 104, etc.).

The following provides various examples that generally pertain to the video generation system 112. According to various examples, the video generation system 112 can perform video stabilization. By way of illustration, video stabilization techniques can be applied before and/or after naive time-lapse frame decimation. According to another illustration, a temporal coarse-to-fine stabilization technique that stabilizes the input video 104, then subsamples the frames in time by a small amount, and then repeats this process until a desired video length is reached can be employed.

The video generation system 112 can create a smooth hyper-lapse video (e.g., the output hyper lapse video 102) from casually captured first-person video (e.g., the input video 104), for instance. Structure-from-motion techniques can be utilized by the reconstruction component 202 to operate on sequences by clustering the input, solving a series of sub-problems, and merging results. Moreover, the reconstruction component 202 can densify the resulting point clouds in a second pass and then interpolate depth maps per input frame. This provides the input to the path planning component 120.

Further, a view-independent quality metric that accounts for foreshortening induced by texture-mapping source images onto final views can be used. This metric can be integrated into the path planning objective and can result in a path that is smooth as well as placed and oriented to be renderable from the available input frames of the input video 104. Moreover, each output frame can be rendered from selected input frames that are capable of covering the frame as defined by the path planning. The input frames can be stitched and blended to create the output frames. The pipeline can produce smooth hyper-lapse video while mitigating cropping.

Moreover, while various $L_2$ metrics for smoothness and stability are described herein, it is contemplated that $L_1$ measures may additionally or alternatively be used (e.g., as part of one or more of the techniques described herein), for example. Further, a rolling shutter used in many conventional cameras can cause a variety of wobble artifacts; thus, it is contemplated that, according to an example, various techniques to account for such wobble artifacts can be applied to the input video 104 (e.g., by the preprocess component 302) before further processing. Pursuant to yet another example, various recognition algorithms and/or user input can be used to gain a semantic understanding of a scene of the input video 104, which can be incorporated to adjust speed along the smoothed path, camera orientation, skip uninformative sections of the input video 104, and so forth.

Figure 10:
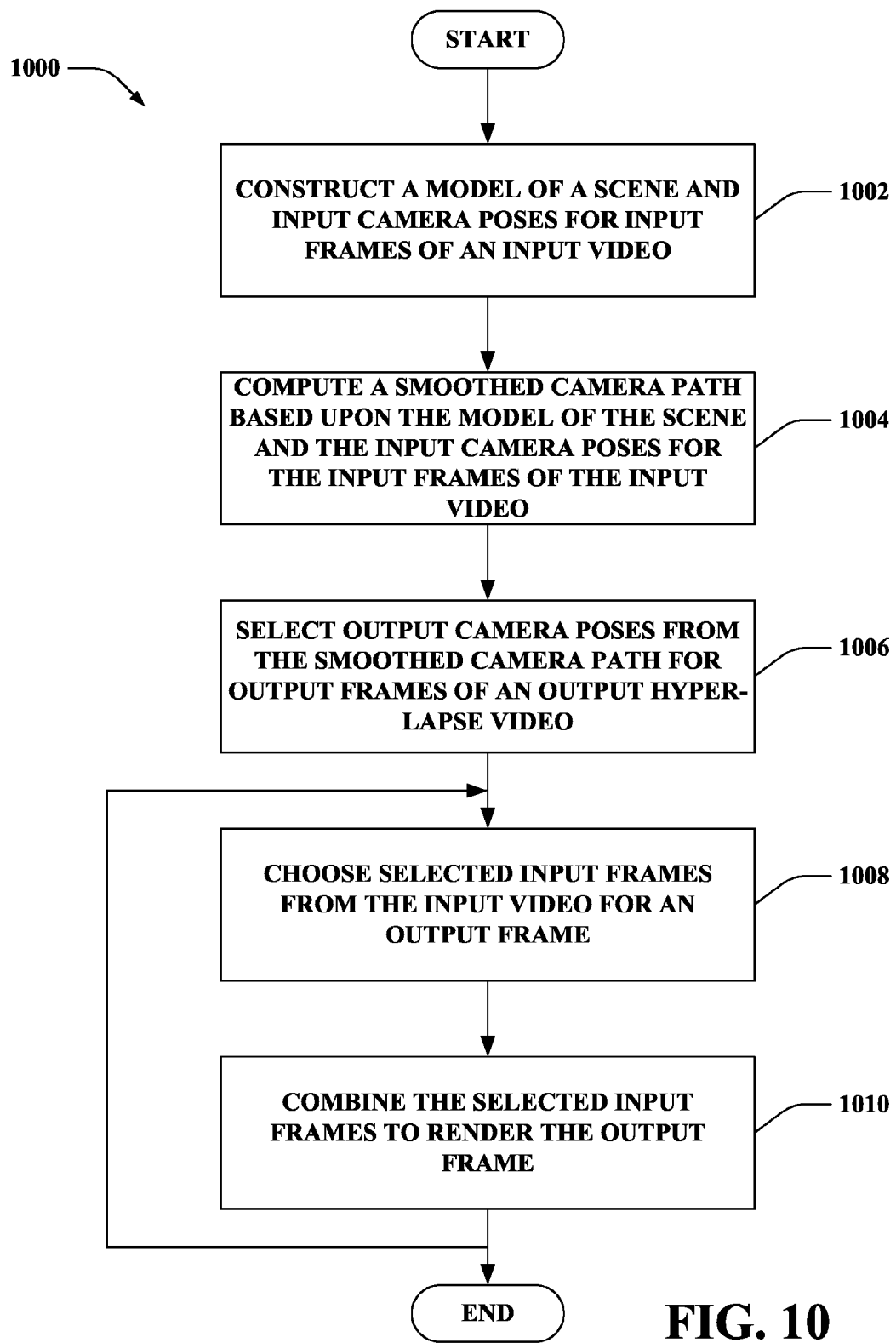
FIG. 10 is a flow diagram that illustrates an exemplary methodology of generating an output hyper-lapse video from an input video.
Figure 11:
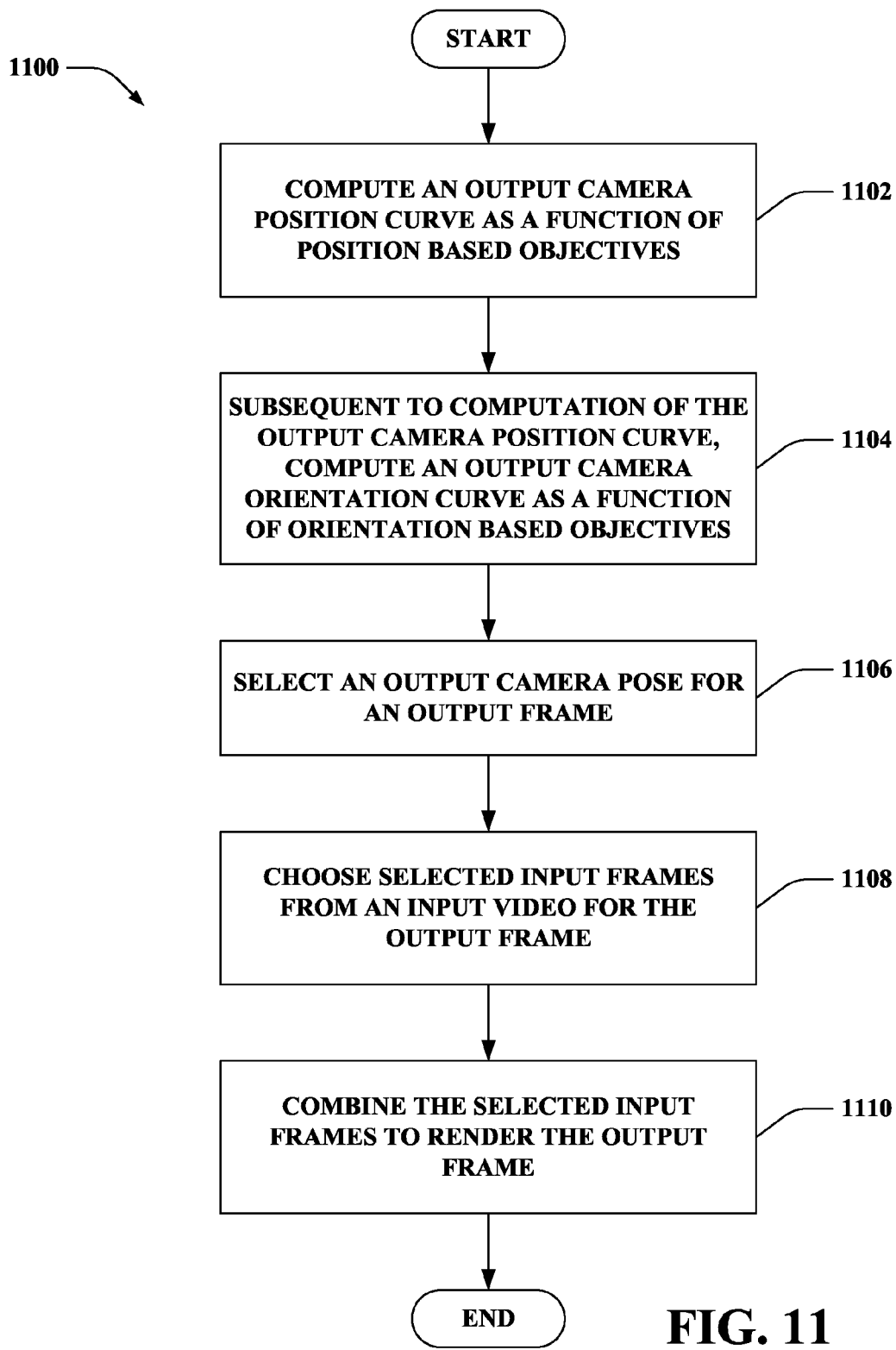
FIG. 11 is a flow diagram that illustrates an exemplary methodology of rendering an output frame.

FIGS. 10-11 illustrate exemplary methodologies relating to creation of an output video (e.g., an output hyper-lapse video) from an input video. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

FIG. 10 illustrates a methodology 1000 of generating an output hyper-lapse video from an input video. At 1002, a model of a scene and input camera poses for input frames of the input video can be constructed. At 1004, a smoothed camera path can be computed based upon the model of the scene and the input camera poses for the input frames of the input video. At 1006, output camera poses can be selected from the smoothed camera path for output frames of the output hyper-lapse video. At 1008, selected input frames from the input video can be chosen for an output frame. The selected input frames can be chosen based at least in part upon an output camera pose for the output frame. At 1010, the selected input frames can be combined to render the output frame. The methodology 1000 can repeat act 1008 and act 1010 for each of the output frames of the output hyper-lapse video.

Turning to FIG. 11, illustrated is a methodology 1100 of rendering an output frame. At 1102, an output camera position curve can be computed as a function of position based objectives. At 1104, an output camera orientation curve can be computed as a function of orientation based objectives. The output camera orientation curve can be computed subsequent to computation of the output camera position curves. Further, the output camera orientation curve can be computed with the output camera position curve fixed as previously computed. At 1106, an output camera pose can be selected for the output frame. At 1108, selected input frames from an input video can be chosen for the output frame. The selected input frames can be chosen based at least in part upon the output camera poses for the output frame. At 1110, the selected input frames can be combined to render the output frame.

Figure 12:
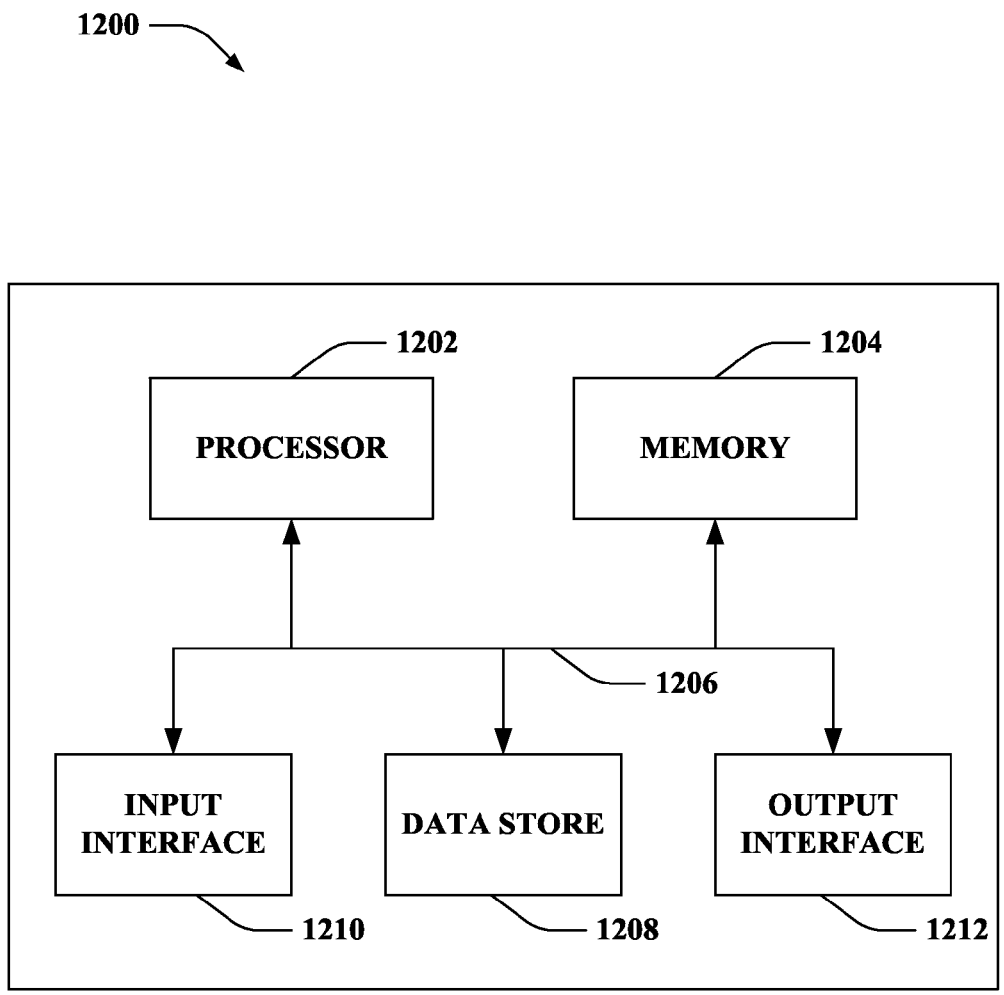
FIG. 12 illustrates an exemplary computing device.

Referring now to FIG. 12, a high-level illustration of an exemplary computing device 1200 that can be used in accordance with the systems and methodologies disclosed herein is illustrated. For instance, the computing device 1200 may be used in a system that generates an output hyper-lapse video from an input video. The computing device 1200 includes at least one processor 1202 that executes instructions that are stored in a memory 1204. The instructions may be, for instance, instructions for implementing functionality described as being carried out by one or more components discussed above or instructions for implementing one or more of the methods described above. The processor 1202 may access the memory 1204 by way of a system bus 1206. In addition to storing executable instructions, the memory 1204 may also store an input video, an output hyper-lapse video, a model of a scene, input camera poses, output camera poses, a smoothed camera path, lookup tables for a pre-computed view quality metric, and so forth.

The computing device 1200 additionally includes a data store 1208 that is accessible by the processor 1202 by way of the system bus 1206. The data store 1208 may include executable instructions, an input video, an output hyper-lapse video, a model of a scene, input camera poses, output camera poses, a smoothed camera path, lookup tables for a pre-computed view quality metric, etc. The computing device 1200 also includes an input interface 1210 that allows external devices to communicate with the computing device 1200. For instance, the input interface 1210 may be used to receive instructions from an external computer device, from a user, etc. The computing device 1200 also includes an output interface 1212 that interfaces the computing device 1200 with one or more external devices. For example, the computing device 1200 may display text, images, etc. by way of the output interface 1212.

It is contemplated that the external devices that communicate with the computing device 1200 via the input interface 1210 and the output interface 1212 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 1200 in a manner free from constraints imposed by input device such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 1200 may be a distributed system. Thus, for instance, several devices may be in communication by way of a network connection and may collectively perform tasks described as being performed by the computing device 1200.

Figure 13:
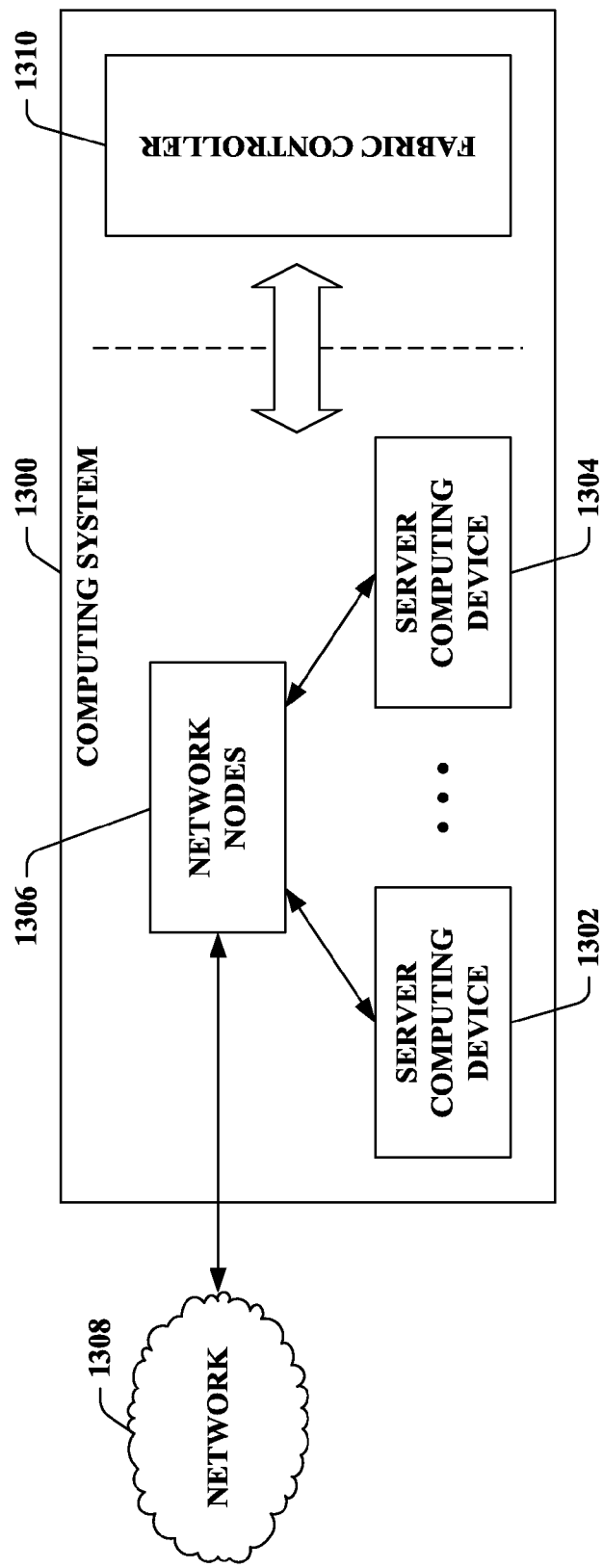
FIG. 13 illustrates an exemplary computing system.

Turning to FIG. 13, a high-level illustration of an exemplary computing system 1300 that can be used in accordance with the systems and methodologies disclosed herein is illustrated. For instance, the computing system 1300 can be or include the computing system 106. Additionally or alternatively, the computing system 106 can be or include the computing system 1300.

The computing system 1300 includes a plurality of server computing devices, namely, a server computing device 1302, . . . , and a server computing device 1304 (collectively referred to as server computing devices 1302-1304). The server computing device 1302 includes at least one processor and a memory; the at least one processor executes instructions that are stored in the memory. The instructions may be, for instance, instructions for implementing functionality described as being carried out by one or more components discussed above or instructions for implementing one or more of the methods described above. Similar to the server computing device 1302, at least a subset of the server computing devices 1302-1304 other than the server computing device 1302 each respectively include at least one processor and a memory. Moreover, at least a subset of the server computing devices 1302-1304 include respective data stores.

Processor(s) of one or more of the server computing devices 1302-1304 can be or include the processor 108. Further, a memory (or memories) of one or more of the server computing devices 1302-1304 can be or include the memory 110. Moreover, a data store (or data stores) of one or more of the server computing devices 1302-1304 can be or include the data store 114.

The computing system 1300 further includes various network nodes 1306 that transport data between the server computing devices 1302-1304. Moreover, the network nodes 1302 transport data from the server computing devices 1302-1304 to external nodes (e.g., external to the computing system 1300) by way of a network 1308. The network nodes 1302 also transport data to the server computing devices 1302-1304 from the external nodes by way of the network 1308. The network 1308, for example, can be the Internet, a cellular network, or the like. The network nodes 1306 include switches, routers, load balancers, and so forth.

A fabric controller 1310 of the computing system 1300 manages hardware resources of the server computing devices 1302-1304 (e.g., processors, memories, data stores, etc. of the server computing devices 1302-1304). The fabric controller 1310 further manages the network nodes 1306. Moreover, the fabric controller 1310 manages creation, provisioning, de-provisioning, and supervising of virtual machines instantiated upon the server computing devices 1302-1304.

Various examples are now set forth.

Example 1

A computing system, comprising: a processor; and a memory that comprises a video generation system that is executable by the processor, the video generation system comprising: a path plan component that computes a smoothed camera path based upon an input video, the path plan component selects output camera poses from the smoothed camera path for output frames of an output hyper-lapse video; and a render component that, for each of the output frames: chooses one or more selected input frames from the input video for an output frame, the selected input frames chosen based at least in part upon an output camera pose for the output frame; and combines the selected input frames to render the output frame.

Example 2

The computing system according to Example 1, the video generation system further comprises a reconstruction component that constructs a model of a scene and input camera poses for input frames of the input video, wherein the path plan component computes the smoothed camera path based upon the model of the scene and the input camera poses for the input frames of the input video.

Example 3

The computing system according to any of Examples 1-2, the path plan component computes the smoothed camera path as a function of: a length of the smoothed camera path; position smoothness of the smoothed camera path; orientation smoothness of the smoothed camera path; proximity of the smoothed camera path to input camera positions for the input video; and a view quality metric indicative of image-based rendering quality from a model of a scene along the smoothed camera path.

Example 4

The computing system according to Example 3, the smoothed camera path comprises an output camera position curve and an output camera orientation curve, the path plan component further comprises: a position analysis component that computes the output camera position curve as a function of the length of the smoothed camera path, the position smoothness of the smoothed camera path, and the proximity of the smoothed camera path to the input camera positions for the input video; and an orientation analysis component that computes the output camera orientation curve as a function of the orientation smoothness of the smoothed camera path and the view quality metric, the orientation analysis component computes the output camera orientation curve with the output camera position curve remaining fixed as previously computed by the position analysis component.

Example 5

The computing system according to Example 4, the orientation analysis component pre-computes the view quality metric.

Example 6

The computing system according to any of Examples 1-5, the path plan component computes a view quality metric indicative of image-based rendering quality from a model of a scene along the smoothed camera path, the smoothed camera path being computed based upon the view quality metric, the view quality metric being a view-independent measure of an amount of foreshortening induced by texture mapping an original image onto a proxy geometry.

Example 7

The computing system according to any of Examples 1-6, the output camera poses respectively comprise output camera positions, the output camera positions being evenly spaced along the smoothed camera path in arc-length.

Example 8

The computing system according to any of Examples 1-6, the output camera poses respectively comprise output camera positions, the output camera positions being spaced based upon input camera velocities from the input video.

Example 9

The computing system according to any of Examples 1-8, the render component further comprises a source frame selection component that: identifies candidate input frames for the output frame, the candidate input frames identified from the input frames of the input video; generates respective weight maps for the candidate input frames; and chooses the selected input frames for the output frame from the candidate input frames based upon the weight maps.

Example 10

The computing system according to Example 9, the source frame selection component adjusts the respective weight maps for the candidate input frames based upon a per-pixel blur measure and pixel occlusion.

Example 11

The computing system according to any of Examples 1-10, the render component combines the selected input frames for the output frame and selected input frames chosen for output frames that surround the output frame in a frame window to render the output frame.

Example 12

The computing system according to any of Examples 1-11, the render component further comprises a fusion component that stitches and blends the selected input frames to render the output frame for each of the output frames, the selected input frames being stitched and blended by the fusion component using a temporal and spatial seam selection algorithm and Poisson blending.

Example 13

The computing system according to any of Examples 1-12, the video generation system further comprises an interface component that receives the input video from a client computing device by way of a network.

Example 14

The computing system of according to any of Examples 1-13, further comprising: a data store; an image sensor; and the memory further comprises a video capture system that is executable by the processor, the video capture system stores output data from the image sensor in the data store as the input video.

Example 15

A method of generating an output hyper-lapse video from an input video, comprising: constructing a model of a scene and input camera poses for input frames of the input video; computing a smoothed camera path based upon the model of the scene and the input camera poses for the input frames of the input video; selecting output camera poses from the smoothed camera path for output frames of the output hyper-lapse video; and for each of the output frames: choosing selected input frames from the input video for an output frame, the selected input frames chosen based at least in part upon an output camera pose for the output frame; and combining the selected input frames to render the output frame.

Example 16

The method according to Example 15, the smoothed camera path being computed as a function of: a length of the smoothed camera path; position smoothness of the smoothed camera path; orientation smoothness of the smoothed camera path; proximity of the smoothed camera path to input camera positions for the input video, the input camera poses respectively comprise the input camera positions; and a view quality metric indicative of image-based rendering quality from the model of the scene along the smoothed camera path.

Example 17

The method according to any of Examples 15-16, computing the smoothed camera path further comprises: computing a view quality metric indicative of image-based rendering quality from the model of the scene along the smoothed camera path, the view quality metric being a view-independent measure of an amount of foreshortening induced by texture mapping an original image onto a proxy geometry; and computing the smoothed camera path based upon the view quality metric.

Example 18

The method according to any of Examples 15-17, the smoothed camera path comprises an output camera position curve and an output camera orientation curve, and computing the smoothed camera path further comprises: computing the output camera position curve as a function of position based objectives; and subsequent to computation of the output camera position curve, computing the output camera orientation curve as a function of orientation based objectives, the output camera orientation curve being computed with the output camera position curve fixed as previously computed.

Example 19

The method according to any of Examples 15-18, choosing the selected input frames from the input video for the output frame further comprises: identifying candidate input frames for the output frame, the candidate input frames identified from the input frames of the input video; generating respective weight maps for the candidate input frames; and choosing, using a greedy algorithm, the selected input frames for the output frame from the candidate input frames based upon the weight maps.

Example 20

A computer-readable storage medium including computer-executable instructions that, when executed by a processor, cause the processor to perform acts including: computing an output camera position curve as a function of position based objectives; subsequent to computation of the output camera position curve, computing an output camera orientation curve as a function of orientation based objectives, the output camera orientation curve being computed with the output camera position curve fixed as previously computed; selecting an output camera pose for an output frame, the output camera pose being selected from the output camera position curve and the output camera orientation curve; choosing selected input frames from an input video for the output frame, the selected input frames being chosen based at least in part upon the output camera pose for the output frame; and combining the selected input frames to render the output frame.

Example 21

A system that generates an output hyper-lapse video from an input video, comprising: means for computing a smoothed camera path based upon the input video; means for selecting output camera poses from the smoothed camera path for output frames of the output hyper-lapse video; means for choosing one or more selected input frames from the input video for each of the output frames, the selected input frames chosen based at least in part upon an output camera pose for an output frame; and means for combining the selected input frames to render each of the output frames.

As used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices.

Further, as used herein, the term "exemplary" is intended to mean "serving as an illustration or example of something."

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, include compact disc (CD), laser disc, optical disc, digital versatile disc (DVD), floppy disk, and blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A computing system, comprising:
at least one processor; and
memory that comprises computer-executable instructions that, when executed by the at least one processor, cause the at least one processor to perform acts including:
computing a smoothed camera path based upon an input video that captures a period of time during which a camera moves through a space;
selecting output camera poses from the smoothed camera path for output frames of an output hyper-lapse video, the output camera poses for the output frames of the output hyper-lapse video being selected to speed up the period of time during which the camera moves through the space in the output hyper-lapse video relative to the input video, the output camera poses comprise output camera positions and output camera orientations for the output frames of the output-hyper lapse video, the output camera positions being evenly spaced along the smoothed camera path in arc-length; and
for each of the output frames of the output hyper-lapse video:
choosing one or more selected input frames from the input video for an output frame, the selected input frames chosen based at least in part upon an output camera position and an output camera orientation for the output frame; and
combining the selected input frames to render the output frame.

2. The computing system of claim 1, the memory further comprises computer-executable instructions that, when executed by the at least one processor, cause the at least one processor to perform acts including:
constructing a model of a scene and input camera poses for input frames of the input video, wherein the smoothed camera path is computed based upon the model of the scene and the input camera poses for the input frames of the input video.

3. The computing system of claim 1, the smoothed camera path being computed as a function of:
a length of the smoothed camera path;
position smoothness of the smoothed camera path;
orientation smoothness of the smoothed camera path;
proximity of the smoothed camera path to input camera positions for the input video; and
a view quality metric indicative of image-based rendering quality from a model of a scene along the smoothed camera path.

4. The computing system of claim 3, wherein:
the smoothed camera path comprises an output camera position curve and an output camera orientation curve; and
the memory further comprises computer-executable instructions that, when executed by the at least one processor, cause the at least one processor to perform acts including:
computing the output camera position curve as a function of the length of the smoothed camera path, the position smoothness of the smoothed camera path, and the proximity of the smoothed camera path to the input camera positions for the input video; and
computing the output camera orientation curve as a function of the orientation smoothness of the smoothed camera path and the view quality metric, wherein the output camera orientation curve is computed with the output camera position curve remaining fixed as previously computed.

5. The computing system of claim 4, the memory further comprises computer-executable instructions that, when executed by the at least one processor, cause the at least one processor to perform acts including:
pre-computing the view quality metric.

6. The computing system of claim 1, the memory further comprises computer-executable instructions that, when executed by the at least one processor, cause the at least one processor to perform acts including:
computing a view quality metric indicative of image-based rendering quality from a model of a scene along the smoothed camera path, the smoothed camera path being computed based upon the view quality metric, the view quality metric being a view-independent measure of an amount of foreshortening induced by texture mapping an original image onto a proxy geometry.

7. The computing system of claim 1, the memory further comprises computer-executable instructions that, when executed by the at least one processor, cause the at least one processor to perform acts including:
identifying candidate input frames for the output frame, the candidate input frames identified from the input frames of the input video;
generating respective weight maps for the candidate input frames; and
choosing the selected input frames for the output frame from the candidate input frames based upon the weight maps.

8. The computing system of claim 7, the memory further comprises computer-executable instructions that, when executed by the at least one processor, cause the at least one processor to perform acts including:
adjusting the respective weight maps for the candidate input frames based upon a per-pixel blur measure and pixel occlusion.

9. The computing system of claim 1, the memory further comprises computer-executable instructions that, when executed by the at least one processor, cause the at least one processor to perform acts including:
combining the selected input frames for the output frame and selected input frames chosen for output frames that surround the output frame in a frame window to render the output frame.

10. The computing system of claim 1, the memory further comprises computer-executable instructions that, when executed by the at least one processor, cause the at least one processor to perform acts including:
    stitching and blending the selected input frames to render the output frame for each of the output frames, the selected input frames being stitched and blended using a temporal and spatial seam selection algorithm and Poisson blending.

11. The computing system of claim 1, the memory further comprises computer-executable instructions that, when executed by the at least one processor, cause the at least one processor to perform acts including:
    receiving the input video from a client computing device by way of a network.

12. The computing system of claim 1, further comprising:
    a data store;
    an image sensor; and
    the memory further comprises computer-executable instructions that, when executed by the at least one processor, cause the at least one processor to perform acts including:
        storing output data from the image sensor in the data store as the input video.

13. A method of generating an output hyper-lapse video from an input video, comprising:
    constructing a model of a scene and input camera poses for input frames of the input video;
    computing a smoothed camera path based upon the model of the scene and the input camera poses for the input frames of the input video;
    selecting output camera poses from the smoothed camera path for output frames of the output hyper-lapse video, the output camera poses comprise output camera positions and output camera orientations for the output frames of the output hyper-lapse video, the output camera positions being evenly spaced along the smoothed camera path in arc-length; and
    for each of the output frames of the output hyper-lapse video:
        choosing selected input frames from the input video for an output frame, the selected input frames chosen based at least in part upon an output camera position and an output camera orientation for the output frame; and
        combining the selected input frames to render the output frame.

14. The method of claim 13, the smoothed camera path being computed as a function of:
    a length of the smoothed camera path;
    position smoothness of the smoothed camera path;
    orientation smoothness of the smoothed camera path;
    proximity of the smoothed camera path to input camera positions for the input video, the input camera poses respectively comprise the input camera positions; and
    a view quality metric indicative of image-based rendering quality from the model of the scene along the smoothed camera path.

15. The method of claim 13, computing the smoothed camera path further comprises:
    computing a view quality metric indicative of image-based rendering quality from the model of the scene along the smoothed camera path, the view quality metric being a view-independent measure of an amount of foreshortening induced by texture mapping an original image onto a proxy geometry; and
    computing the smoothed camera path based upon the view quality metric.

16. The method of claim 13, the smoothed camera path comprises an output camera position curve and an output camera orientation curve, and computing the smoothed camera path further comprises:
    computing the output camera position curve as a function of position based objectives; and
    subsequent to computation of the output camera position curve, computing the output camera orientation curve as a function of orientation based objectives, the output camera orientation curve being computed with the output camera position curve fixed as previously computed.

17. The method of claim 13, choosing the selected input frames from the input video for the output frame further comprises:
    identifying candidate input frames for the output frame, the candidate input frames identified from the input frames of the input video;
    generating respective weight maps for the candidate input frames; and
    choosing, using a greedy algorithm, the selected input frames for the output frame from the candidate input frames based upon the weight maps.

18. A computing system, comprising:
    at least one processor; and
    memory that comprises computer-executable instructions that, when executed by the at least one processor, cause the at least one processor to perform acts including:
        computing a smoothed camera path based upon an input video that captures a period of time during which a camera moves through a space;
        selecting output camera poses from the smoothed camera path for output frames of an output hyper-lapse video, the output camera poses for the output frames of the output hyper-lapse video being selected to speed up the period of time during which the camera moves through the space in the output hyper-lapse video relative to the input video, the output camera poses comprise output camera positions and output camera orientations for the output frames of the output-hyper lapse video, the output camera positions being spaced based upon input camera velocities from the input video; and
        for each of the output frames of the output hyper-lapse video:
            choosing one or more selected input frames from the input video for an output frame, the selected input frames chosen based at least in part upon an output camera position and an output camera orientation for the output frame; and
            combining the selected input frames to render the output frame.

19. The computing system of claim 18, the memory further comprises computer-executable instructions that, when executed by the at least one processor, cause the at least one processor to perform acts including:
    constructing a model of a scene and input camera poses for input frames of the input video, wherein the smoothed camera path is computed based upon the model of the scene and the input camera poses for the input frames of the input video.

20. The computing system of claim 18, the smoothed camera path being computed as a function of:
    a length of the smoothed camera path;
    position smoothness of the smoothed camera path;
    orientation smoothness of the smoothed camera path;

proximity of the smoothed camera path to input camera positions for the input video; and a view quality metric indicative of image-based rendering quality from a model of a scene along the smoothed camera path.

21. The computing system of claim 20, wherein:

the smoothed camera path comprises an output camera position curve and an output camera orientation curve; and the memory further comprises computer-executable instructions that, when executed by the at least one processor, cause the at least one processor to perform acts including:

computing the output camera position curve as a function of the length of the smoothed camera path, the position smoothness of the smoothed camera path, and the proximity of the smoothed camera path to the input camera positions for the input video; and computing the output camera orientation curve as a function of the orientation smoothness of the smoothed camera path and the view quality metric, wherein the output camera orientation curve is computed with the output camera position curve remaining fixed as previously computed.

22. The computing system of claim 21, the memory further comprises computer-executable instructions that, when executed by the at least one processor, cause the at least one processor to perform acts including:

pre-computing the view quality metric.

23. The computing system of claim 18, the memory further comprises computer-executable instructions that, when executed by the at least one processor, cause the at least one processor to perform acts including:

computing a view quality metric indicative of image-based rendering quality from a model of a scene along the smoothed camera path, the smoothed camera path being computed based upon the view quality metric, the view quality metric being a view-independent measure of an amount of foreshortening induced by texture mapping an original image onto a proxy geometry.

24. The computing system of claim 18, the memory further comprises computer-executable instructions that, when executed by the at least one processor, cause the at least one processor to perform acts including:

identifying candidate input frames for the output frame, the candidate input frames identified from the input frames of the input video;

generating respective weight maps for the candidate input frames; and choosing the selected input frames for the output frame from the candidate input frames based upon the weight maps.

25. The computing system of claim 24, the memory further comprises computer-executable instructions that, when executed by the at least one processor, cause the at least one processor to perform acts including:

adjusting the respective weight maps for the candidate input frames based upon a per-pixel blur measure and pixel occlusion.

26. The computing system of claim 18, the memory further comprises computer-executable instructions that, when executed by the at least one processor, cause the at least one processor to perform acts including:

combining the selected input frames for the output frame and selected input frames chosen for output frames that surround the output frame in a frame window to render the output frame.

27. The computing system of claim 18, the memory further comprises computer-executable instructions that, when executed by the at least one processor, cause the at least one processor to perform acts including:

stitching and blending the selected input frames to render the output frame for each of the output frames, the selected input frames being stitched and blended using a temporal and spatial seam selection algorithm and Poisson blending.

28. The computing system of claim 18, the memory further comprises computer-executable instructions that, when executed by the at least one processor, cause the at least one processor to perform acts including:

receiving the input video from a client computing device by way of a network.

29. The computing system of claim 18, further comprising:

a data store;

an image sensor; and the memory further comprises computer-executable instructions that, when executed by the at least one processor, cause the at least one processor to perform acts including:

storing output data from the image sensor in the data store as the input video.

30. A method of generating an output hyper-lapse video from an input video, comprising:

constructing a model of a scene and input camera poses for input frames of the input video;

computing a smoothed camera path based upon the model of the scene and the input camera poses for the input frames of the input video;

selecting output camera poses from the smoothed camera path for output frames of the output hyper-lapse video, the output camera poses comprise output camera positions and output camera orientations for the output frames of the output hyper-lapse video, the output camera positions being spaced based upon input camera velocities from the input video; and for each of the output frames of the output hyper-lapse video:

choosing selected input frames from the input video for an output frame, the selected input frames chosen based at least in part upon an output camera position and an output camera orientation for the output frame; and combining the selected input frames to render the output frame.

31. The method of claim 30, the smoothed camera path being computed as a function of:

a length of the smoothed camera path;

position smoothness of the smoothed camera path;

orientation smoothness of the smoothed camera path;

proximity of the smoothed camera path to input camera positions for the input video, the input camera poses respectively comprise the input camera positions; and a view quality metric indicative of image-based rendering quality from the model of the scene along the smoothed camera path.

32. The method of claim 30, computing the smoothed camera path further comprises:

computing a view quality metric indicative of image-based rendering quality from the model of the scene along the smoothed camera path, the view quality metric being a view-independent measure of an amount of foreshortening induced by texture mapping an original image onto a proxy geometry; and computing the smoothed camera path based upon the view quality metric.

33. The method of claim 30, the smoothed camera path comprises an output camera position curve and an output camera orientation curve, and computing the smoothed camera path further comprises:
   computing the output camera position curve as a function of position based objectives; and
   subsequent to computation of the output camera position curve, computing the output camera orientation curve as a function of orientation based objectives, the output camera orientation curve being computed with the output camera position curve fixed as previously computed.

34. The method of claim 30, choosing the selected input frames from the input video for the output frame further comprises:
   identifying candidate input frames for the output frame, the candidate input frames identified from the input frames of the input video;
   generating respective weight maps for the candidate input frames; and
   choosing, using a greedy algorithm, the selected input frames for the output frame from the candidate input frames based upon the weight maps.

* * * * *